US012737202B1

(12) United States Patent
Pathak et al.

(10) Patent No.: US 12,737,202 B1

(45) Date of Patent: Sep. 15, 2026

(54) LOCALIZATION OF WIDGETS FOR A SOFTWARE APPLICATION

(71) Applicant: DocuSign, Inc., San Francisco, CA (US)

(72) Inventors: Avanish Pathak, Rochester, NY (US); Bhargav Krishna, Snohomish, WA (US); Colin Larry Sprague, Thousand Oaks, CA (US); Hector Barbera, Seattle, WA (US); Matthew Ritchie, Walnut Creek, CA (US)

(73) Assignee: Docusign, Inc., San Francisco, CA (US)

( * ) Notice: Subject to any disclaimer, the term of this patent is extended or adjusted under 35 U.S.C. 154(b) by 266 days.

(21) Appl. No.: 18/513,094

(22) Filed: Nov. 17, 2023

(51) Int. Cl.
*G06F 9/451* (2018.01)

(52) U.S. Cl.
CPC .................................. *G06F 9/454* (2018.02)

(58) Field of Classification Search
CPC ...................................................... G06F 9/454
See application file for complete search history.

(56) References Cited

U.S. PATENT DOCUMENTS

| | | | | |
|---|---|---|---|---|
| 1,188,923 | A | 6/1916 | George | |
| 7,333,927 | B2 | 2/2008 | Lee et al. | |
| 8,312,390 | B2 * | 11/2012 | Fitzpatrick | G06F 3/0481 715/762 |
| 8,412,511 | B2 * | 4/2013 | Jackson | G06F 40/40 704/8 |
| 8,434,072 | B2 * | 4/2013 | Pawlowsky | G06F 9/454 717/137 |
| 8,438,007 | B1 * | 5/2013 | Hokari | G06F 9/454 704/7 |
| 9,104,661 | B1 * | 8/2015 | Evans | G06F 40/58 |
| 9,262,398 | B2 * | 2/2016 | Swerdlow | G06F 40/197 |
| 9,442,924 | B2 * | 9/2016 | Lui | G06F 40/284 |
| 9,727,628 | B2 | 8/2017 | Stading et al. | |
| 9,977,684 | B2 | 5/2018 | Arseniev et al. | |
| 10,789,080 | B2 * | 9/2020 | Levy | G06F 16/958 |

(Continued)

OTHER PUBLICATIONS

U.S. Appl. No. 18/345,799, filed Jun. 30, 2023, naming inventors Pathak et al.

(Continued)

*Primary Examiner* — Kenny Nguyen

(74) *Attorney, Agent, or Firm* — Shumaker & Sieffert, P.A.

(57) ABSTRACT

A system for deploying a software application includes processing circuitry obtains configuration information for the software application specifying a first widget configured to indicate a first identifier for a first string and a second widget configured to indicate a second identifier for a second string. The processing circuitry configures a client device to obtain the configuration information and localization information associated with the software application. The processing circuitry generates instructions configured to cause the client device to generate a first string value for the first string based on the first identifier and the localization information and generate a second string value for the second string based on the second identifier and the localization information. The processing circuitry outputs the instructions to the client device to render a graphical user interface based, at least in part, on the first string value and the second string value.

20 Claims, 19 Drawing Sheets

(56) References Cited

U.S. PATENT DOCUMENTS 11,200,076 B2 * 12/2021 He .......................... G06F 40/47
11,861,332 B2 * 1/2024 Abraham .............. G06F 16/951
12,307,072 B2 5/2025 Gupta et al.
12,380,996 B2 * 8/2025 Fenster ................... G06F 9/454
2010/0306747 A1 * 12/2010 Pawlowsky ............. G06F 9/454 717/137
2010/0318743 A1 * 12/2010 Fitzpatrick ............ G06F 3/0481 711/E12.017
2012/0017146 A1 * 1/2012 Travieso ................. G06F 40/58 715/265
2012/0022851 A1 * 1/2012 Bremner ................. G06F 9/454 704/3
2014/0310585 A1 * 10/2014 Masuko .................. G06F 40/58 715/230
2015/0039287 A1 * 2/2015 Han ........................ G06F 40/58 704/2
2015/0161097 A1 * 6/2015 Swerdlow ............. G06F 40/263 704/9
2015/0269140 A1 9/2015 Fitzpatrick et al.
2016/0103826 A1 * 4/2016 Lui ....................... G06F 40/205 704/3
2017/0147562 A1 * 5/2017 Bhuvaneswaran ..... G06F 40/47
2019/0302897 A1 10/2019 Wespel et al.
2022/0050879 A1 2/2022 Singh et al.
2023/0062336 A1 * 3/2023 Abraham ................ G06F 9/454
2023/0259249 A1 8/2023 Doken
2023/0298742 A1 * 9/2023 Fenster ..................... G06F 8/65 717/169
2024/0242038 A1 * 7/2024 Davis ...................... G06F 40/40

OTHER PUBLICATIONS

U.S. Appl. No. 18/345,815, filed Jun. 30, 2023, naming inventors Pathak et al.
U.S. Appl. No. 18/426,771, filed Jan. 30, 2024, naming inventors Pathak et al.

* cited by examiner

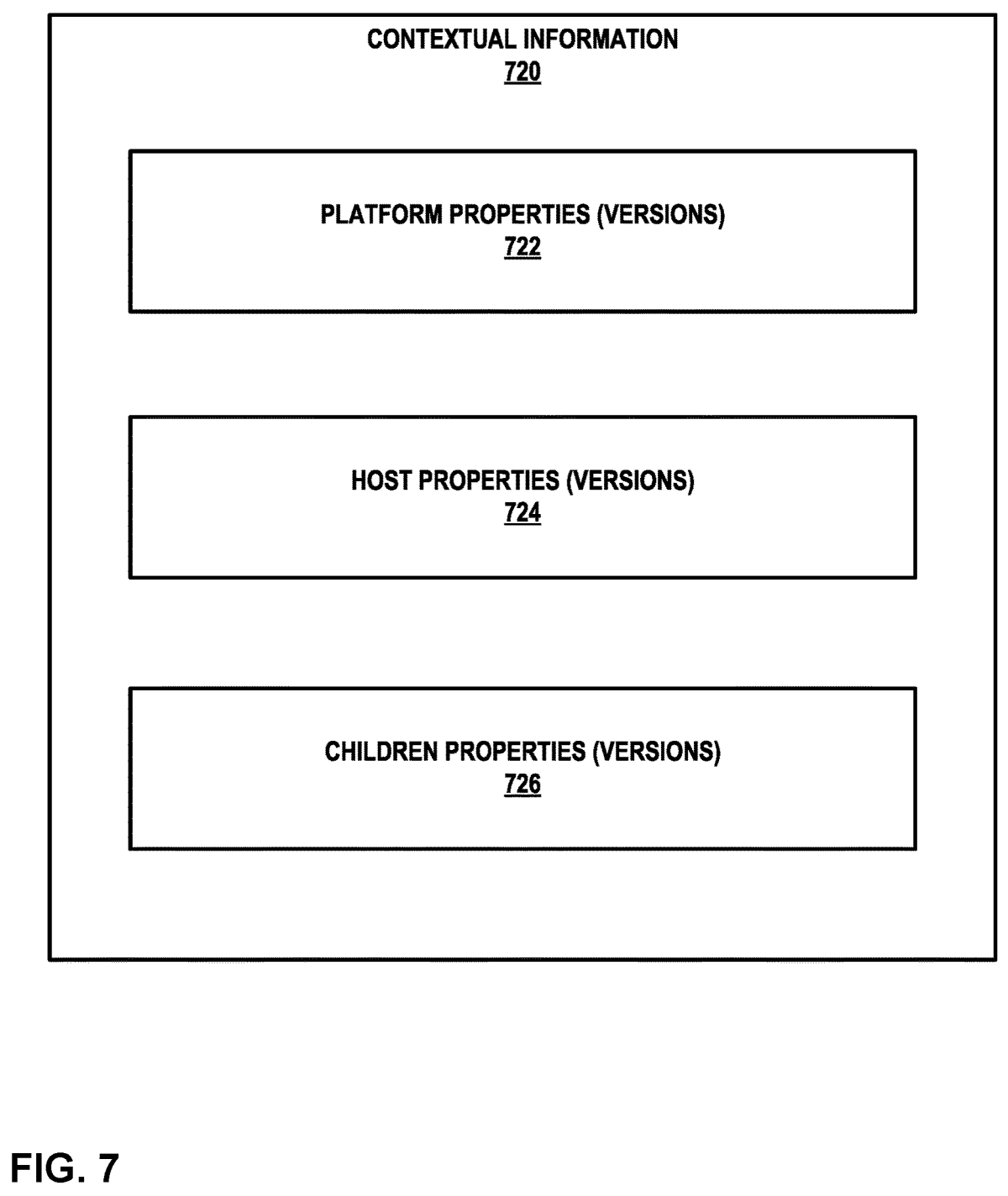

CONTEXTUAL INFORMATION
720

PLATFORM PROPERTIES (VERSIONS)
722

HOST PROPERTIES (VERSIONS)
724

CHILDREN PROPERTIES (VERSIONS)
726

FIG. 7

LOCALIZATION OF WIDGETS FOR A SOFTWARE APPLICATION

TECHNICAL FIELD

This disclosure relates generally to management of widgets for a software application.

BACKGROUND

Localization is a process that may convert experiences provided by a software application according to language, cultural, or other locality conventions. For example, a graphical user interface of software application may be configured to display text in a selected language.

SUMMARY

The disclosure describes techniques, devices, and systems for managing localization of software applications. The techniques described herein disclose a computing system configured to manage deployment of widgets used in the execution of software applications. The computing system may manage widgets for software applications with configuration files that may include configuration information and/or localization information (e.g, a mapping of string values in various localities to corresponding string identifiers of strings indicated in a widget) for widgets developed by software developers. The computing system may generate configuration files with configuration information (e.g., widget location in a content repository, widget dependencies, etc.) once a software developer commits a widget to a content repository. The computing system may include localization information in corresponding configuration files based on localization conducted by software developers or other personnel responsible for developing the localization information for widgets.

The computing system may configure client devices with a shell interface to execute widgets of a requested software application and to render a graphical user interface according to a locality (e.g., a language, a country, a zip code, etc.). The computing system may configure a shell interface to obtain configuration information and localization information for widgets of a requested software application based on configuration files associated with the widgets. The shell interface may be configured, by the computing system, to generate string values for strings of widgets associated with an experience provided by a graphical user interface associated with a requested software application. The shell interface may be configured to generate string values based on the localization information and string identifiers indicated in each of the widgets of the software application. For instance, the shell interface may output the string value "Welcome" in response to determining that the string identifier is "WelcomeID" and the localization information for the locality maps the string identifier "WelcomeID" to the string value "Welcome." The computing system may output instructions to the shell interface to render a graphical user interface based, at least in part, on the generated string values.

In some systems, developers may develop and deploy individual widgets that may be stitched together at run-time to execute software applications. Developers may create widgets with string identifiers (e.g., "Welcome," "date," etc.). Localization teams may manually create localization information for software application by determining string identifiers indicated in widgets for the software application, then mapping string identifiers to string values in various localities. However, this may result in a duplication of effort in instances where different applications may load the same widget. Localization teams may determine string values for string identifiers of the same widget loaded by different software applications. Techniques described herein include a system that enables localization teams to asynchronously create localization information for widgets by mapping string identifiers and string values in various localities.

In accordance with the techniques of this disclosure, a computing system may determine string values for rendering an experience of a software application based on localization information for an application and string identifiers indicated in widgets loaded by the software application. The computing system may manage localization information for a software application based on localization information developed for each widget of the software application. Localization information for a software application may map string identifiers of the widget to string values in various localities. The widgets may be configured to indicate string identifiers to support different localities. The computing system may configure a shell interface of a client device to implement run-time localization of software applications based on localization information and string identifiers. By configuring a client device to implement localization information for each instance of each widget of a software application at run-time, computing system may reduce an amount of errors associated implementing localization information compared to systems that rely on localization information on a per software application basis implemented during development or build-time of the software applications.

The computing system may receive telemetry information associated with localization information applied by client devices. For example, the computing system may receive telemetry information such as instances a particular locality is requested for a widget and/or instances a string value for a locality is missing from localization information associated with a widget. The computing system may use the telemetry information to provide insight and/or alerts to developers on how developed widgets are being consumed such that developers may tailor widget development according to a particular demographic. For example, the computing system may use the telemetry information to provide insight into what localities or languages are being requested for each widget to help developers of a widget identify localizations or translations to implement. The computing system may use the telemetry information to detect, missing localization information such as missing string values for particular localities. The developers of a widget may use the telemetry information to prioritize generation of localization information. For instance, a developer team for a particular widget may prioritize translation of string values from English to Spanish instead of a translation to German when the telemetry information indicates a larger number of requests for the widget in Spanish than German. The computing system may use the telemetry information to support efficient strategies on which widgets may need prompt localization information. In this way, the computing system may manage which widgets for software applications need localization information to more effectively render experiences at runtime according to multiple localities than systems that do not generate the telemetry information.

In one example, the present disclosure describes a system for deploying a software application includes processing circuitry and non-transitory computer-readable storage media. The non-transitory computer-readable storage media includes logic that, when executed, causes the processing circuitry to obtain configuration information for the software application. The configuration information specifying a first widget configured to indicate a first identifier for a first string and a second widget configured to indicate a second identifier for a second string. The logic further causes the processing circuitry to configure a client device to obtain the configuration information and localization information associated with the software application. The logic further causes the processing circuitry to generate instructions configured to cause the client device to generate a first string value for the first string based on the first identifier and the localization information and generate a second string value for the second string based on the second identifier and the localization information. The logic further causes the processing circuitry to output the instructions to the client device to render a graphical user interface based, at least in part, on the first string value and the second string value.

In another example, the present disclosure describes a method for deploying a software application. The method may include obtaining, by processing circuitry, configuration information for the software application, the configuration information specifying a first widget configured to indicate a first identifier for a first string and a second widget configured to indicate a second identifier for a second string. The method further includes configuring, by the processing circuitry, a client device to obtain the configuration information and localization information associated with the software application. The method further includes generating, by the processing circuitry, instructions configured to cause the client device to generate a first string value for the first string based on the first identifier and the localization information and generate a second string value for the second string based on the second identifier and the localization information. The method further includes outputting, by the processing circuitry, the instructions to the client device to render a graphical user interface based, at least in part, on the first string value and the second string value.

In one example, computer-readable storage media includes logic that, when executed, configures processing circuitry to obtain configuration information for the software application, the configuration information specifying a first widget configured to indicate a first identifier for a first string and a second widget configured to indicate a second identifier for a second string. The logic further configures the processing circuitry to configure a client device to obtain the configuration information and localization information associated with the software application. The logic further configures the processing circuitry to generate instructions configured to cause the client device to generate a first string value for the first string based on the first identifier and the localization information and generate a second string value for the second string based on the second identifier and the localization information. The logic further configures the processing circuitry to output the instructions to the client device to render a graphical user interface based, at least in part, on the first string value and the second string value.

In another example, a non-transitory computer-readable storage media includes logic that, when executed, configures processing circuitry to obtain configuration information for the software application, the configuration information specifying a first widget configured to indicate a first identifier for a first string and a second widget configured to indicate a second identifier for a second string. The logic further configures the processing circuitry to configure a client device to obtain the configuration information and localization information associated with the software application. The logic further configures the processing circuitry to generate instructions configured to cause the client device to generate a first string value for the first string based on the first identifier and the localization information and generate a second string value for the second string based on the second identifier and the localization information. The logic further configures the processing circuitry to output the instructions to the client device to render a graphical user interface based, at least in part, on the first string value and the second string value.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

FIG. 7 is a conceptual diagram illustrating example contextual information to load a software application, in accordance with the techniques of this disclosure.

DETAILED DESCRIPTION

Figure 1:
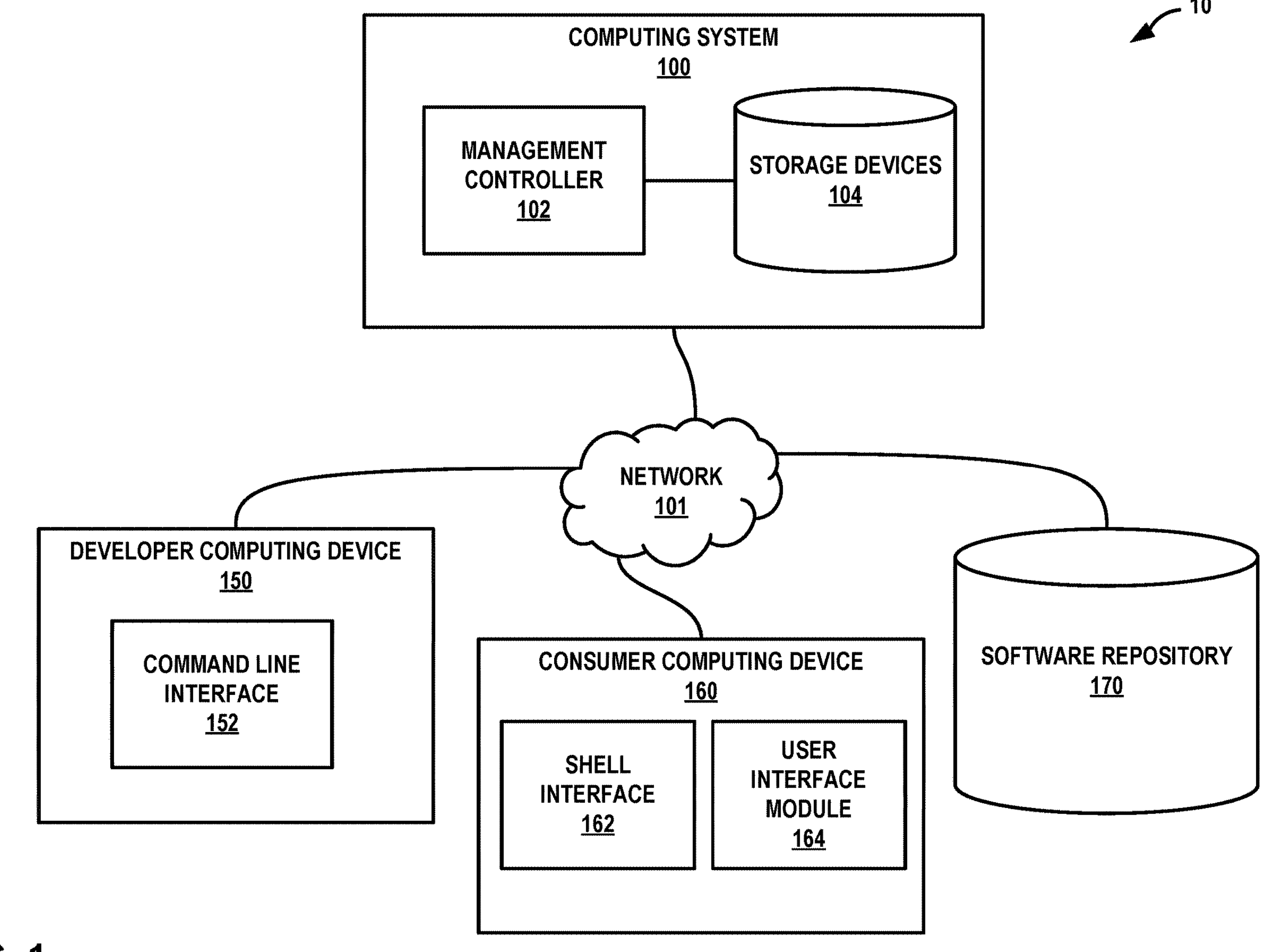
FIG. 1 is a block diagram illustrating an example computing environment for managing deployment of a software application, in accordance with techniques of this disclosure.

In general, aspects of the present disclosure describe techniques for deploying a software application (e.g., a software application for document management). A software application (e.g., an application provided via a browser or operating system of a client device) associated with document management may include one or more user experiences related to managing electronic or digital documents (e.g., generate an electronic document, sign an electronic document, etc.). For example, a first user experience may generate data for displaying a contract and a second user experience may direct a user to verify an identity of a user viewing the contract. Software applications may be deployed with multiple widgets, each widget including instructions for implementing a respective user experience. As used herein, a widget may refer to a collection of software code used by the software application to provide a user experience (e.g., create a new Portable Document Format (PDF) file, open a PDF file, etc.). For example, a widget may include a snippet of JavaScript® logic that runs in a web browser. Software developers may create, update, integrate, deploy, or otherwise develop widgets for software applications via a continuous integration and continuous deployment ("CI/CD") environment. For instance, a software developer of a widget for a software application may develop and release updates to a first widget for the software application without manually coordinating with developers of other widgets for the software application. Instead, the CI/CD environment itself is configured to automatically ensure that releases of new widgets and new versions of widgets are continuously deployed while maintaining stability of the software application.

Software developers may use the CI/CD environment to deploy a new version of a software application or a software application component (e.g., widget) by instructing consumer devices to load code files associated with the new versions of the software application or software application component. A CI/CD computing system may dynamically deploy new versions of a software application component (e.g., widget) during runtime and/or execution of a software application implementing the software application component. The CI/CD computing system may dynamically deploy new versions of widgets without restarting a server hosting the software application component and/or without using a load balancer. For example, rather than assembling code files or widgets for a software application during build-time (e.g., during internal development of code), the CI/CD computing system may provide instructions identifying the most recently deployed version of each widget used in the software application and configure a client device to execute the software applications based on the instructions. In this example, a client device may retrieve each widget from a content repository and assemble the code for the software application at run-time (e.g., during execution of the software application).

For example, the CI/CD computing system may dynamically deploy a new version of a widget by, for example, progressively sending instructions to requesting client devices to execute the new version of the widget. Some CI/CD environments may redirect consumer-related software application requests (e.g., network-based requests made for the software application) by rebooting a server hosting the software application to include the new version of the software application. Some CI/CD environments may reduce or eliminate rebooting a server of a CI/CD computing system (e.g., a cloud-based server and/or content delivery network) by, for example, implementing a load balancer to redirect software application requests to another server hosting the new version of the software application. For example, a CI/CD computing system may include a load balancer developed to redirect consumer traffic from a server of the CI/CD computing system hosting a current version of a widget to a different server of the CI/CD computing system hosting a new version of a widget. However, developing load balancers may consume excess computational resources and may require additional development of implementing a load balancer for each software application managed by the CI/CD computing system. The techniques described herein may include a CI/CD computing system that may send instructions to execute a new version of a widget by specifying an identifier and/or an address (e.g., a uniform resource indicator) associated with the new version of the widget in a configuration file included in the instructions to execute a requested software application implementing the widget. In this way, the CI/CD computing system may manage deployment of new versions of software application components without implementing load balancers.

In an example of a CI/CD computing system, a singular application shell (e.g., a shell interface) may allow for potentially an unlimited number of distributed applications (e.g., widgets) that can potentially host an unlimited number of child widgets in a completely modular way. This may be referred to herein as runtime loading and rendering of widgets. The shell, when executed by processing circuitry, can, based on one or more conditions, create dynamic experiences on a website to stitch together multiple widgets in real time. The shell can load child widgets by, for example, invoking a central utility function offered by the shell and use initial data for hydration and/or bootstrapping of the experience offered by the shell. In this way, the CI/CD computing system may provide one or more of the following benefits: (1) ensure one or more parent widgets are able to customize certain behaviors in a child widget; (2) prevent redundancy of the same business logic; (3) pass along relevant contextual data that might already exist in the parent widget and might be needed in the child widget; and/or (4) at the time of making this request to the shell, the host widget may pass the identifier (ID) of the child widget and pass any additional data the child might use to initialize/bootstrap/start/setup. The shell may load the initialization scripts and/or hydrate the fragmented application code referred to by the child widget, before passing the child's data dependencies on the host. The shell (e.g., executing at a client device) may be positioned to execute runtime validation of host and/or child contracts.

CI/CD computing systems may manage localization information for software applications. CI/CD computing systems may manage localization information created asynchronously to the development and/or deployment of software applications. For example, a developer team for a widget may release code for a widget with localization information for English only and request a translation for the localization information into other languages. In this example, the code for the widget may be released asynchronously from the generation all of the localization information for the widget (e.g., all the string values translated by human beings into French, Spanish, and German).

In the context where CI/CD computing systems manage widgets for software applications (e.g., software application components), localization information for software applications may be fragmented into localization information for widgets for software applications. This results in complexity for managing and supporting multiple localities for various widgets for many software applications. The techniques described herein may include a CI/CD computing system that configures a client device to implement localization information for each widget of a requested software application according to a locality. The CI/CD computing system managing localization information for widgets, rather than software applications, may reduce duplication of effort.

The client device may be configured to implement the localization information to generate string values that may be included when rendering a graphical user interface associated with the requested software application. The client device may generate the string values at run-time (e.g., during execution of the software application) based on localization information that may be asynchronously developed and string identifiers indicated by strings of widgets for the software application. By configuring a client device to implement localization information at run-time, the CI/CD computing system may consistently enforce and monitor localizations of widgets for software application. In some examples, the client device may generate the string values based on "fallback" or default localization information in instances where there is missing localization information for a widget. For instance, if a locality for a widget specifies Spanish and the widget does not support Spanish, the client device may use localization information for English when English is the fallback or default locality. The client device may report instances of missing localization information (e.g., a missing string value for a locality supported by a widget or a lack of localization information for a locality) to the CI/CD computing system. The client device may render a graphical user interface associated with an experience provided by the software application based on generated string values to ensure that all strings of widgets for the software application are assigned string values. In this way, the CI/CD computing system may ensure that a complete experience is provided by graphical user interfaces associated with requested software applications. Moreover, the CI/CD system uses a shell interface to apply localization rather than individual widgets, which may help to reduce a duplication of effort.

FIG. 1 is a block diagram illustrating an example computing environment 10 for managing deployment of a software application, in accordance with techniques of the disclosure. In the example of FIG. 1, computing environment 10 includes computing system 100, network 101, developer computing device 150, consumer computing device 160, and software repository 170. Computing environment 10 may represent a CI/CD environment for developers to write and release widgets for software applications. Computing environment 10 may include a starter kit, utilities, standard development kits, application programming interfaces, or other developer resources. Computing system 100 may manage the developer resources to help developers upload code to a repository that is compatible with other code in the repository. In some examples, computing system 100 may represent a cloud computing system that provides one or more services via network 101. Computing system 100 may include a collection of hardware devices, software components, and/or data stores that can be used to implement one or more applications or services provided to developer computing device 150 and consumer computing device 160 via network 101. Computing system 100 may represent a cloud-based implementation. As used herein, a client device may refer to developer computing device 150, consumer computing device 160, or a device that performs the function of both developer computing device 150 and consumer computing device 160.

Network 101 may include the Internet or may include or represent any public or private communications network or other network. For instance, networks 101 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 101 using any suitable communication techniques. Network 101 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 101 using one or more network links. The links coupling such devices or systems to network 101 may be Ethernet, Asynchronous Transfer Mode (ATM) or other types of network connections, and such connections may be wireless and/or wired connections. One or more of the devices or systems illustrated in FIG. 1 or otherwise on network 101 may be in a remote location relative to one or more other illustrated devices or systems.

Computing system 100, developer computing device 150, consumer computing device 160, and software repository 170 may send and receive data via network 101. Data exchanged over the network 101 may be represented using any suitable format, such as hypertext markup language (HTML), extensible markup language (XML), or JavaScript Object Notation (JSON). In some aspects, network 101 may include encryption capabilities to ensure the security of documents. For example, encryption technologies may include secure sockets layers (SSL), transport layer security (TLS), virtual private networks (VPNs), and Internet Protocol security (IPsec), among others.

In the example of FIG. 1, computing system 100 may include one or more servers locally managed by a software administrator or a distributed or cloud-based computing system managed by the software administrator. Computing system 100 may include one or more computing devices, servers, databases, etc. communicably coupled to perform the techniques described herein. Computing system 100 may include management controller 102 and storage devices 104. Management controller 102 may be a module with instructions to manage new and/or updated software applications. For example, management controller 102 may be configured to upload and/or update configuration files associated with widget configuration information used to implement a software application. Management controller 102 may store new and/or updated configuration files associated with widget configuration information in storage devices 104. Storage devices 104 may represent one or more physical or virtual computer and/or storage devices that include or otherwise have access to storage media. Functionality of management controller 102 and storage devices 104, as described herein, may be distributed across multiple computing devices within the distributed or cloud-based environment of computing system 100.

Examples of developer computing device 150 and consumer computing device 160 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. Developer computing device 150 and consumer computing device 160 may be examples of client devices that may interact with computing system 100 to upload, use, or otherwise access software applications managed by computing system 100.

Developer computing device 150 may include command line interface 152. Developer computing device 150 may be operated by a software developer who may upload and access code for a software application based on configuration information received from computing system 100. Command line interface 152 may provide an interactive environment for developers to develop and deploy software applications. Command line interface 152 may include, but is not limited to, a shell terminal or application programming interface managed by computing system 100. As used herein, a shell terminal may refer to a software program that acts as command-line interpreter for services related to an application provided by computing system 100. For example, command line interface 152 may process commands (e.g., user inputs) received by developer computing device 150 to generate instructions and output, via network 101, the instructions to computing system 100 and/or to software repository 170. For instance, developer computing device 150 may use command line interface 152 to upload software code to software repository 170.

Developer computing device 150 may push or pull software applications and resources associated with the software applications from software repository 170. Software repository 170 may include, but is not limited to, a content delivery network, cloud storage systems, or any collection of databases used to store and send software files. For example, software repository 170 may be a content delivery network that implements Microsoft Solutions Framework®.

Consumer computing device 160 may include shell interface 162 and user interface (UI) module 164. Consumer computing device 160 may be a computing device operated by a consumer of software applications managed by computing system 100. Shell interface 162 may include, but is not limited to, a website browser interface, an application programming interface provided by an operating system of consumer computing device 160, a command line interface, or the like. Shell interface 162 may request data from computing system 100 and software repository 170 via network 101 to load widgets for executing a software application. Consumer computing device 160 may request access to a software application with shell interface 162 (e.g., a browser shell interface and/or application interface). For example, consumer computing device 160 may request a software application to manage electronic documents with shell interface 162.

UI module 164, as shown in the example of FIG. 1, may be operable by consumer computing device 160 to perform one or more functions, such as receive input and send indications of such input to other components associated with consumer computing device 160, such as shell interface 162. UI module 164 may also receive data from components associated with consumer computing device 160, such as shell interface 162. Using the data received, UI module 164 may cause other components associated with consumer computing device 160 (e.g., a presence sensitive display device, a monitor, or other display device) to output a graphical user interface according to the data. In other words, UI module 164 may provide outputs via a display device and based on the data. For instance, UI module 164 may receive data from shell interface 162 to display a graphical user interface.

In some instances, shell interface 162 may instruct UI module 164 to output a graphical user interface based on a plugin associated with a requested software application. Shell interface 162 may obtain configuration information for retrieving a plugin and zero or more utility widgets of a software application and generate contextual information used in the execution of the software application. A plugin may be a type of widget that includes data for a graphical user interface that outputs data associated with the one or more utility widgets underlying a software application. In some examples, a plugin may be a type of widget corresponding to a reference (e.g., uniform resource locator or uniform resource indicators (URL)) for a software application. A utility widget may be a type of widget that support functionality of a software application without including a frontend user interface. Utility widgets may be shared by different software applications due to the ensured compatibility according to the techniques described herein. Plugins and utility widgets may be assigned to a domain (e.g., a web domain such as domain.net) that is managed by software repository 170. References to a software application, or widgets of the software application, may be URLs that append the domain managed by software repository 170. For example, a software application may be assigned a domain of domain.net. The software application may include a widget that includes a reference to append the domain assigned to the software application, such as a reference of "/widget" that appends the domain to be "domain.net/widget."

Techniques described herein may apply a common knowledge base (e.g., computing system 100) to regulate network traffic to new versions of software applications. In this way, the techniques help to reduce or eliminate restarting a host of a software application when a new version of the software application is deployed. The techniques described herein may help to improve an availability of software repository 170, which may potentially improve a user's experience using the software applications. Computing System 100 may send consumer computing device 160 instructions to execute a new version of a software application without interrupting the experience of a user operating consumer computing device 160 while executing the new version of the software application.

Computing system 100 may manage and/or instruct client devices to seamlessly render, at runtime, graphical user interfaces for software applications according to various localities at runtime, rather than including localization information in software applications at build time or having to instruct client devices to re-execute a software application in response to receiving a request to change a locality of the software application.

In accordance with the techniques of the disclosure, computing system 100 may support localization switching across independently developed widgets for various software applications. Computing system 100 may configure consumer computing device 160 with shell interface 162 for rendering a graphical user interface associated with instances of widgets for a software application. Computing system 100 may instruct shell interface 162 to render the graphical user interface according to a locality. Shell interface 162 may render graphical user interfaces according to multiple localities, such as, for example, sets of language-based or country-based preferences of users interacting with the graphical user interface. Shell interface 162 may render graphical user interfaces based on localization information developed based on cultural and/or language requirements (e.g., traditional Mandarin, simplified Mandarin, etc.) associated with users from various geographical locations. In some instances, computing system 100 may instruct shell interface 162 to render the graphical user interface according to a locality selected by a user operating consumer computing device 160. For example, UI module 164 may receive data from shell interface 162 to render a graphical user interface with a drop-down list or other graphical control element that a user may select to change the locality of a software application (e.g., change from English to Spanish). UI module 164 may send shell interface 162 data associated with a detection of a user selecting the change in locality of the software application. In response to shell interface 162 receiving an indication of a user selecting to change the locality to Spanish, shell interface 162 may use a localization frame wrapper to each instance of each widget for the software application. Shell interface 162 may apply a localization frame wrapper to each instance of each widget to generate string values for string identifiers used when rendering a user experience according to the selected locality (e.g., Spanish). In some instances, computing system 100 may instruct shell interface 162 to render the graphical user interface according to a locality detected by shell interface 162.

Shell interface 162 may request a locality from an operating system of consumer computing device 160. Shell interface 162 may obtain the locality from the operating system of consumer computing device 160 based on preferences, settings, or other configurations associated with a locality preference associated with consumer computing device 160. For example, shell interface 162 may obtain a French locality preference from the operating system of consumer computing device 160. In response to obtaining the French locality preference, shell interface 162 may generate instructions to render a graphical user interface associated with requested software applications according to a French locality. Shell interface 162 may apply a localization frame wrapper to each instance of each widget of requested software application to generate the instructions for rendering a user experience according to the detected locality (e.g., French).

Computing system 100 may configure shell interface 162 to generate instructions for rendering a graphical user interface according to a selected and/or detected locality preference associated with consumer computing device 160. Shell interface 162 may check if the selected or detected locality is supported by each instance of each widget for a requested software application. In response to shell interface 162 determining that an instance of a widget for the requested software application supports a selected or detected locality, shell interface 162 may apply a localization frame wrapper to generate string values for the instance of the widget based on localization information associated with the selected or detected locality and string identifiers associated with the instance of the widget. Shell interface 162 may generate instructions to render a graphical user interface with the generated string values associated with the instance of the widget. In response to shell interface 162 determining that an instance of a widget for the requested software application does not support the selected or detected locality, shell interface 162 may generate string values for string identifiers associated with the instance of the widget based on a default or fallback locality. Shell interface 162 may generate instructions to render the graphical user interface with the generated string values associated with the instance of the widget.

In an example, computing system 100 may obtain a request from consumer computing device 160 to execute a software application associated with at least a first widget and a second widget. Computing system 100 may configure shell interface 162 to obtain the first and second widget from software repository 170. Computing system 100 may configure shell interface 162 to obtain a locality preference from an operating system of consumer computing device 160. In this example, shell interface 162 may obtain a locality preference of Spanish. Shell interface 162 may determine the first widget supports a Spanish locality and the second widget does not support the Spanish locality. Shell interface 162 may implement a localization frame wrapper to generate string values for string identifiers of the instance of the first widget based on localization information associated with the first widget and the Spanish locality. Shell interface 162 may generate string values for string identifiers of the instance of the second widget based on default or fallback localization information (e.g., English localization information) associated with the second widget. Shell interface 162 may generate instructions to render a graphical user interface associated with the requested software application based on the generated string values for string identifiers of the first widget and the generated string values for string identifiers of the second widget.

Computing system 100 may configure consumer computing device 160 with shell interface 162 to manage localities on a per widget basis. For example, rather than managing locality translations for each page of a user interface or each software application product, computing system 100 may manage locality translations for widgets that may be implemented in various software application pages or products.

Computing system 100 may configure consumer computing device 160 with shell interface 162 that supports runtime localization changes of string values of instances of widgets for software applications. Shell interface 162 may render a graphical user interface according to a locality specified in preferences associated with consumer computing device 160. Shell interface 162 may check whether all widgets of the fragmented software application support the locality associated with consumer computing device 160. In instances when shell interface 162 determines all widgets of the software application support the locality, shell interface 162 may download localization information associated with the locality and apply a translation function to orchestrate a smooth locality transition.

For example, shell interface 162 may orchestrate a smooth locality transition by implementing a translation function of a localization frame wrapper that does not re-download widgets of the software or re-execute code associated with the software application, rather shell interface 162 manages localization transitions while widgets for a software application are deployed and executed for display by consumer computing device 160. Shell interface 162 may use the translation function of the localization frame wrapper to output a localization transition via a graphical user interface in real-time.

In instances when shell interface 162 determines at least one widget of the software application does not support the locality, shell interface 162 may notify computing system 100 of the instance. For example, shell interface 162 may notify computing system 100 of instances associated with a widget missing localization information for a locality (e.g., localization information for a widget does not include translations in Spanish) or with localization information for a widget missing string values for string identifiers (e.g., an updated widget with new string identifiers do not have certain locality string values). Computing system 100 may log the instance in a telemetry log for further analysis. In this way, computing system 100 may assist in the decision by developers of a widgets of which localities for which widgets to developed based on requested localities for specific widgets logged in the telemetry log.

In operation, computing system 100 may obtain configuration information for a software application. Computing system 100 may obtain configuration information of widgets for a software application. Computing system 100 may obtain configuration metadata for a widget that may specify localities a widget supports and/or indicate identifiers for strings rendered in a graphical user interface associated with the software application. For example, computing system 100 may obtain configuration information for widgets that indicate identifiers for strings such as "Header 1." In some instances, computing system 100 may obtain configuration information that includes localization information that provides corresponding string values for string identifiers of an instance of a widget in different localities. For example, computing system 100 may obtain configuration information for an instance of a widget with a string identifier of "Header 1" and with localization information indicating the string value in an English locality for the string identifier "Header 1" is "Welcome." Computing system 100 may obtain the configuration information from software repository 170. In some examples, computing system 100 may obtain localization information from developer computing device 150 or may generate localization information internally. Computing system 100 may send localization information associated with instances of widgets to consumer computing device 160 in a response to a request to execute a software application.

Computing system 100 may receive a request from consumer computing device 160 to execute a software application. Management controller 102 of computing system 100 may generate instructions for executing the software application at consumer computing device 160. Management controller 102 may output instructions to consumer computing device 160. For example, computing system 100 may output instructions to consumer computing device 160 that causes consumer computing device 160 to load a widget associated with the requested software application. Management controller 102 may configure shell interface 162 to obtain widgets and corresponding configuration information for the software application from software repository 170. Management controller 102 may configure shell interface 162 to generate contextual information of properties (e.g., widget dependencies, font preferences, etc.) associated with the obtained widgets. Shell interface 162, may generate contextual information based on corresponding configuration information associated with each widget of the software application. Shell interface 162 may execute the software application based on properties specified in the contextual information. In some instances, shell interface 162 may generate instructions for rendering a graphical user interface based on contextual information associated with a plugin (e.g., a widget that stitches together utility widgets for display) of the software application. In general, management controller 102 may cause shell interface 162 to obtain and execute widgets associated with a requested software application to render an experience for a user of consumer computing device 160 via a graphical user interface.

Computing system 100, or more specifically, for example, management controller 102, may configure shell interface 162 to obtain localization information associated with widgets of a software application. Shell interface 162 may be configured to obtain localization information of widgets, such as language translations, format changes, or cultural considerations. Shell interface 162 may be configured to obtain localization information of widgets in a software application to render a graphical user interface with string values generated based on localization information associated with a locality (e.g., language, cultural region, etc.).

Computing system 100, or more specifically, for example, management controller 102, may generate instructions configured to cause shell interface 162 to generate string values based on string identifiers generated by each instance of each widget of the software application and localization information. For example, shell interface 162 may be configured to generate a string value for a string of a widget. A string of a widget may include a data structure or object in a graphical user interface, as well as a location the string is positioned in the graphical user interface. Shell interface 162 may generate string values for strings based on localization information specifying corresponding string values for string identifiers indicated in widgets for the software application. In some examples, localization information may provide string values for string identifiers in different localities (e.g., language, format, cultural considerations, etc.).

Computing system 100, or more specifically, for example, management controller 102, may output the instructions that cause consumer computing device 160, or more specifically shell interface 162, to instruct UI module 164 to render a graphical user interface based on the generated string values. In some examples, shell interface 162 may determine string identifiers associated with widgets of the software application, a user selected locality (e.g., a language selected by a user operating consumer computing device 160 or a language detected by an operating system of consumer computing device 160), and localization information (e.g., a language translation file in JSON format) corresponding to the locality. In this example, shell interface 162 may generate string values based on data included in the localization information specifying a mapping of string identifiers to corresponding string values associated with the locality. UI module 164 may output the graphical user interface via a display device of consumer computing device 160.

In some instances, computing system 100 may receive telemetry information from shell interface 162. Shell interface 162 may send computing system 100 telemetry information corresponding to localization information utilized by shell interface 162 when rendering a graphical user interface for software applications. For example, shell interface 162 may send computing system 100 indications of localization information used or requested for instances of each widget. In some instances, shell interface 162 may send computing system 100 telemetry information corresponding to missing localization information for a locality (e.g., localization information for a widget includes not translations in Spanish) or with localization information for a widget missing string values for string identifiers (e.g., an updated widget with new string identifiers do not have certain locality string values). Computing system 100 may store the telemetry information associated with localization information application to widgets of software application in storage devices 104. Computing system 100 may automatically inform developer computing device 150, or any other client device associated with the development and/or deployment of widgets for software applications managed by computing system 100, with insights corresponding to the indications of used, requested, and/or missing localization information. For example, computing system 100 may provide developers insights corresponding to indications of a lack of string values for one or more localities in localization information associated with the widgets.

The techniques described herein may provide one or more technical advantages that realize one or more practical applications. For example, computing system 100 may manage localization information of independently developed widgets for various software applications without using third party localization software services. Computing system 100 may manage localization information for one or more widgets in a JSON-format. Computing system 100 may configure shell interface 162 to obtain localization information for each widget of a requested software application. Computing system 100 may reduce computational resources and time associated with managing localization information for many software applications by intelligently managing localization information for each software application component (e.g., widget) that can be applied throughout various software applications.

Computing system 100 may leverage telemetry information associated with localization information to provide insight to administrators and developers about how widgets are being consumed, by consumer computing device 160 for example. Computing system 100 may leverage telemetry information of localization information application to provide insights to product and design associated with localization of software applications, widgets, graphical user interface experiences, etc. In this way, computing system 100 may automatically provide information to help developers identify deficiencies of localization information, as well as provide the information to help administrators develop effective and efficient strategies in the development of localization information for developed widgets for software applications.

Figure 2:
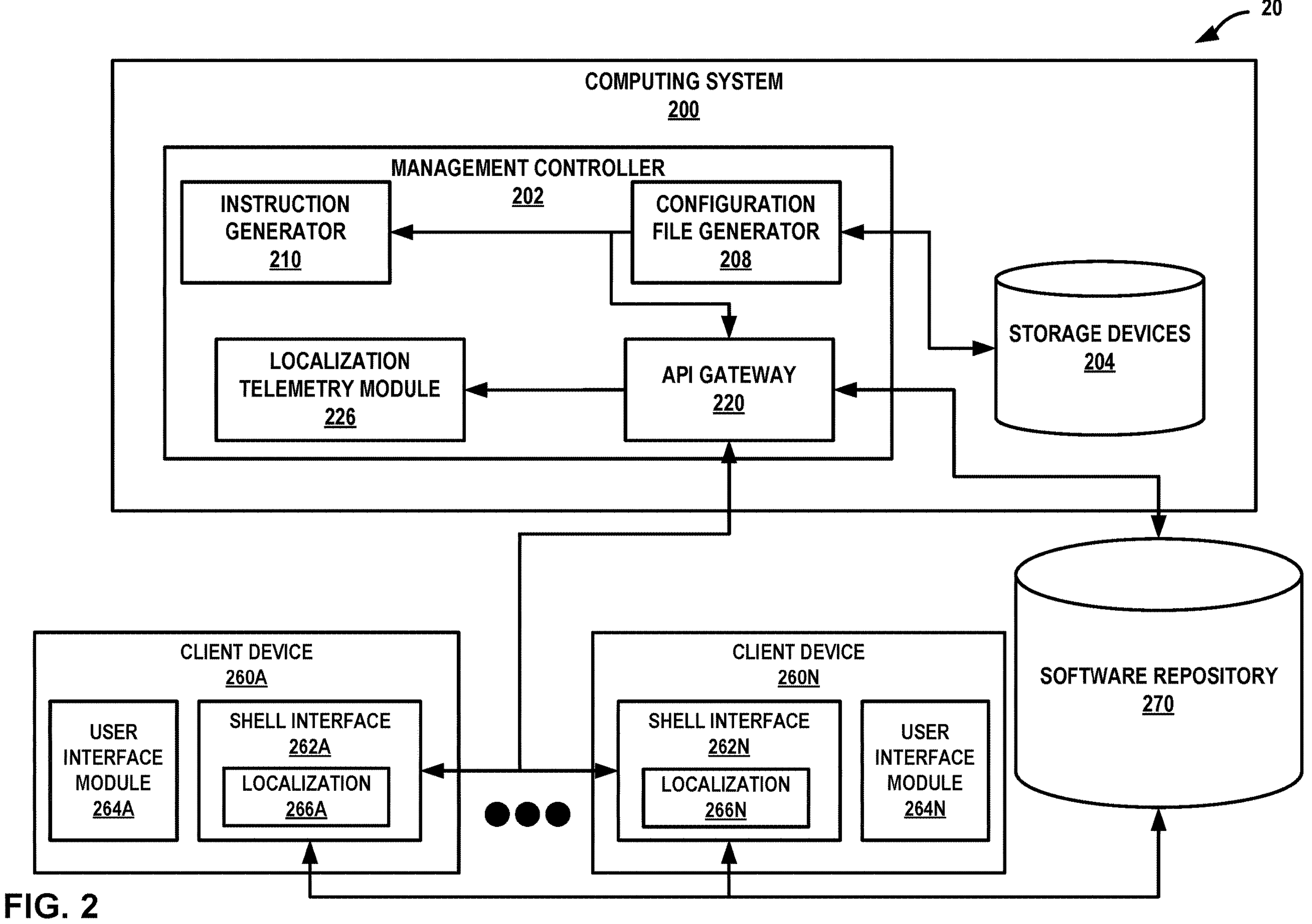
FIG. 2 is a block diagram illustrating an example computing environment with example details of a computing system managing software applications, in accordance with the techniques of this disclosure.

FIG. 2 is a block diagram illustrating an example computing environment 20 for managing software applications, in accordance with the techniques of this disclosure. In the example of FIG. 2, computing environment 20 may include computing system 200, client devices 260A-260N (hereinafter, client devices 260), and software repository 270. Computing system 200, client devices 260 and software repository 270 of FIG. 2 may be described as an example or alternate implementation of computing system 100, consumer computing device 160, and software repository 270 of FIG. 1, respectively. One or more aspects of FIG. 2 may be described herein within the context of FIG. 1 for example purposes only. Computing system 200, client devices 260A-260N, and software repository 270 may be communicably coupled via network 101 of FIG. 1, for example.

Management controller 202 may include instruction generator 210, configuration file generator 208, Application Programming Interface (API) Gateway 220, and localization telemetry module 226. Instruction generator 210 may generate the HTML/JAVASCRIPT to cause the client device to use the configuration file. A developer computing device (e.g., developer computing device 150 of FIG. 1) may upload a new version of a widget to software repository 270. Developer computing device 150 may, for example, upload a new version of a widget as a build artifact. Developer computing device 150 may upload the new version of the widget as a build artifact by wrapping the new version of the widget in a standardized format. Developer computing device 150 uploading the new version of the widget as a build artifact ensures that the new version of the widget is compatible with all other widgets managed by computing system 200.

Configuration file generator 208 may detect whether the new version of a widget has been uploaded to software repository 270. In some instances, configuration file generator 208 may poll software repository 270 periodically (e.g., every three seconds) or based on an event (e.g., product launch). In some examples, configuration file generator 208 may automatically poll and retrieve configuration information associated with an uploaded version of a widget. In this way, software repository 270 does not require customization to send notifications to computing system 200 that a new version of a widget has been uploaded. Configuration file generator 208 may use API Gateway 220 to retrieve configuration information associated with the new version of the widget. In some instances, configuration file generator 208 may only retrieve configuration information of widgets that have been uploaded in a standardized format (e.g., a build artifact).

Configuration file generator 208 may generate a configuration file for a widget based on widget configuration information retrieved from software repository 270. Configuration file generator 208 may generate a configuration file that is a structured representation of widget configuration information. For example, configuration file generator 208 may generate the configuration file to identify, for each widget of an application, a version of each widget and a respective location of where the corresponding version of each widget is stored. In some examples, the configuration file may include the version and one or more of a widget identifier, versions of widget dependencies, a uniform resource indicator (see FIG. 5). Configuration file generator 208 may generate a deployment-ready configuration file for an uploaded widget responsive to the uploaded widget satisfying quality assurance and security tests. For instance, configuration file generator 208 may generate a deployment-ready configuration file for an uploaded widget only when the uploaded widget satisfies quality assurance and security tests. Configuration file generator 208 may allow developers to request that the system provides new or undeployed versions of each widget for testing. Configuration file generator 208 may store configuration files in storage devices 204. Storage devices 204 may represent computer readable media, for example, physical memory stored in a data center or storage provided by a cloud storage system.

Configuration file generator 208 may generate configuration files for a software application in real time. Configuration file generator 208 may generate the configuration files for the software application in response to a new version of a widget implemented by the software application satisfying any pre-deployment requirements (e.g., quality assurance and security tests). For example, configuration file generator 208 may maintain a configuration file for a software application implementing a current version of a widget, as well as generate a configuration file for the same software application with indications that the software application should be implemented with the new version of the widget. In this way, configuration file generator 208 may support testing of new versions of the widget in a pre-deployment environment.

In some instances, configuration file generator 208 may include localization information in configuration files for software application. For example, configuration file generator 208 may include localization information (e.g., language translations, format changes, or cultural considerations for string values in a JSON-format) corresponding to each widget of a software application. Configuration file generator 208 may include localization information that may, for example, specify or map string identifiers and corresponding translations in various localities. Configuration file generator 208 may generate a configuration file to include localization information for each widget of the software application along with corresponding widget configuration information. In some examples, configuration file generator 208 may obtain localization information for each widget of the software application from software repository 270. configuration file generator 208 may store the configuration file with localization information and configuration information in storage devices 204.

Management controller 202, and more specifically, for example, instruction generator 210, may receive requests from client devices 260 to access a software application. Client devices 260 may request access to the software application with shell interfaces 262A-262N (hereinafter, shell interfaces 262). Shell interfaces 262, when executed by processing circuitry, may send a request to access the software application to API Gateway 220. API Gateway 220 may receive the request to access the software application and relay the request to instruction generator 210.

Instruction generator 210 may generate a response to a request from client devices 260 to access the software application. Instruction generator 210 may generate a response that includes an indication of a configuration file. Instruction generator 210 may generate the response that includes either a configuration file including configuration information associated with a current version of the widget or a configuration file including configuration information associated with a new version of the widget. Instruction generator 210 may generate the response to specify multiple widgets used to deploy the requested software application. For example, instruction generator 210 may generate a response that includes configuration information associated with a plugin and one or more utility widgets used to deploy the requested software application.

A plugin may be a type of widget that includes data for a graphical user interface that outputs data associated with the one or more utility widgets underlying a software application. In some examples, a plugin may be a type of widget corresponding to a reference (e.g., uniform resource locator or URL) for a software application. A utility widget may be a type of widget that support functionality of a software application without including a frontend user interface. Utility widgets may be shared by different software applications due to the ensured compatibility according to the techniques described herein. Plugins and utility widgets may be assigned to a domain (e.g., a web domain such as domain.net) that is managed by software repository 270. References to a software application, or widgets of the software application, may be URLs that append the domain managed by software repository 270. For example, a software application may be assigned a domain of domain.net. The software application may include a widget that includes a reference to append the domain assigned to the software application, such as a reference of "/widget" that appends the domain to be "domain.net/widget."

Instruction generator 210, via API gateway 220, may receive, from shell interface 262A, a request to execute a software application by loading a first widget and a second widget. In this example, the software application is configured to execute using at least the first widget and the second widget. Instruction generator 210 may generate instructions for executing the software application at client device 260A. For example, instruction generator 210 may cause configuration file generator 208 to generate a configuration file for providing the software application at client device 260A. For instance, the configuration file may indicate a first widget and a second widget.

Shell interface 262A, when executed by processing circuitry of client device 260A, may receive configuration information and instructions. Shell interface 262A may use the configuration information to request software code files associated with the software application from software repository 270. Software repository 270 may fetch the requested software code files (e.g., widget(s)) and send the files to shell interface 262A. Shell interface 262A may receive the software code files and execute the widgets (e.g., at least a first widget and a second widget).

For example, the instructions many be configured to cause shell interface 262A, when executed by processing circuitry of client device 260A, to generate contextual information for the first widget and contextual information for the second widget. Shell interface 262A may be configured to generate contextual information specifying widgets and data necessary to execute the requested software application. Shell interface 262A may implement the generated contextual information when executing the requested software application.

In accordance with the techniques of the disclosure, computing system 200 may manage localization of widgets for software applications to be executed on client devices 260. In response to receiving the request from client device 260A to access a software application, instruction generator 210 may instruct client device 260A to obtain configuration information (e.g., widget identifier, widget version, widget dependencies, authentication, URL, etc.) and localization information (e.g., language translations, format changes, or cultural considerations for string values in a JSON-format) associated with widgets for the requested software application. Client device 260A may generate contextual information used to execute the software application based on the configuration information associated with the widgets. Client device 260A, or more specifically, for example, user interface module 264A, may render a graphical user interface associated with an experience provided by the software application based on the localization information.

Computing system 200, or more specifically, for example, instruction generator 210, may generate instructions to cause client devices 260 to generate string values based on identifiers and localization information. For example, instruction generator 210, may generate instructions for shell interfaces 262A-262N and configure client devices 260 with the shell interfaces 262A-262N. Shell interface 262A, or more specifically, for example, localization 266A, may generate string values based on string identifiers and localization information specifying string values in different localities and corresponding string identifiers. A widget may be configured to indicate an identifier (also referred to herein as "string identifier") for each string rendered in a graphical user interface associated with the widget for a requested software application. Instruction generator 210 may generate instructions that cause shell interface 262A to generate string values for strings of widgets in a requested application by determining locality translations for string identifiers with localization 266A.

Computing system 200 may configure shell interfaces 262 with localizations 266 to generate string values for strings of widgets of software applications based on string identifiers and localization information. Localizations 266 may include a software module with computer-readable code configured to output string values for instances of widgets for a software application executing at client devices 260. Localizations 266 may determine a locality corresponding to a selected or detected locality for an experience provided by a software application. Localizations 266 may determine whether a locality is supported by all widgets of a software application executing at client devices 260. For example, localizations 266 may determine whether a locality is supported by all widgets of a software application based on metadata of the localization information for each widget. Localizations 266 may include localization frame wrappers that implement translation functions, during execution of the software application, to generate string values for each instance of each widget. For example, localizations 266 may include a first localization frame wrapper that generates string values for a first widget, a second localization frame wrapper that generates string values for a second widget, a third localization frame wrapper that generates string values for a third widget, and so on.

Localizations 266 may include a localization frame wrapper that implements a translation function to determine string values for strings of widgets for a requested software application. For example, localizations 266 may implement a translation function to generate a string value of "bienvenidos" based on a string identifier of "Header 1" and localization information for a Spanish string value for the string identifier of "Header 1" indicated in the widget. In another example, localizations 266 may implement a translation function to generate a string value of "1 November" based on a string identifier of "Date" and localization information for a United Kingdom string value for the string identifier of "Date." Localizations 266 may apply localization frame wrappers for each instance of a widget for the software application. Localizations 266 may include multiple localization frame wrappers to generate—at runtime—string values for strings of various widgets for software applications.

Shell interfaces 262 may be configured to instruct UI modules 264 to render graphical user interfaces for a requested software application based on the generated string values. For example, shell interface 262A may instruct UI module 264A to render a graphical user interface with the generated string values. UI module 264A may output the graphical user interface with the generated string values via a display device (e.g., presence sensitive display, monitor, etc.) of client device 260A. In instances when shell interface 262A receives an indication to change the locality of the graphical user interface, shell interface 262A may apply the localization frame wrapper or translation function of localization 266A to generate string values according to the selected locality and render the graphical user interface with the newly generated string values at runtime.

Localization telemetry module 226 may provide information for identifying insights into a state of localizations applied to widgets managed by computing system 200. Localization telemetry module 226 may obtain telemetry information associated with types of localization information of localizations 266 applied by client devices 260 and any missing localization information associated with widgets for software applications executed by client devices 260. Localization telemetry module 226 may obtain telemetry information from client devices 260, or more specifically shell interfaces 262, via API gateway 220. For example, shell interface 262A may send, via API gateway 220, localization telemetry module 226 localization telemetry information each time shell interface 262A generates string values based on string identifiers and localization 266A. In some instances, when localizations 266 determines whether each widget of a software application supports a locality, localizations 266 may alert or notify localization telemetry module 226 of management controller 202 of the result of the determination. Localizations 266 may send localization telemetry module 226.

For example, localization telemetry module 226 may track the number of instances in which a Spanish locality, a United Kingdom locality, etc. are applied to a widget. Localization telemetry module 226 may provide such insights to an administrator of computing system 200 or to software developers of the widget (e.g., software developers operating developer computing device 150 of FIG. 1). In this way, localization telemetry module 226 may provide information to help to provide insight to administrators and software developers on how widgets are being consumed so that the administrators and software developers may tailor widget development in a more informed way (e.g., tailoring a widget to a United Kingdom locality based on telemetry information specifying the widget has been applied with United Kingdom localization information a majority of the time) or may prioritize localities of particular widgets (e.g., prioritize localizing a widget to a Spanish locality based on telemetry information specifying the widget has been applied with Spanish localization information in the past).

Localization telemetry module 226 may alert software developers of missing localization information. For example, localization telemetry module 226 may receive, via API gateway 220, telemetry information associated with localization 266A not having localization for a string identifier of a widget. Localization telemetry module 226 may send an alert or notification to the computing device of the software developer (e.g., developer computing device 150 of FIG. 1) associated with the widget with missing localization information. In this way, localization telemetry module 226 may provide information to help to support software developers to determine insights on how to develop widgets and may provide a sense of urgency for an administrator to localize the widget such that any missing localization information is mitigated.

Figure 3:
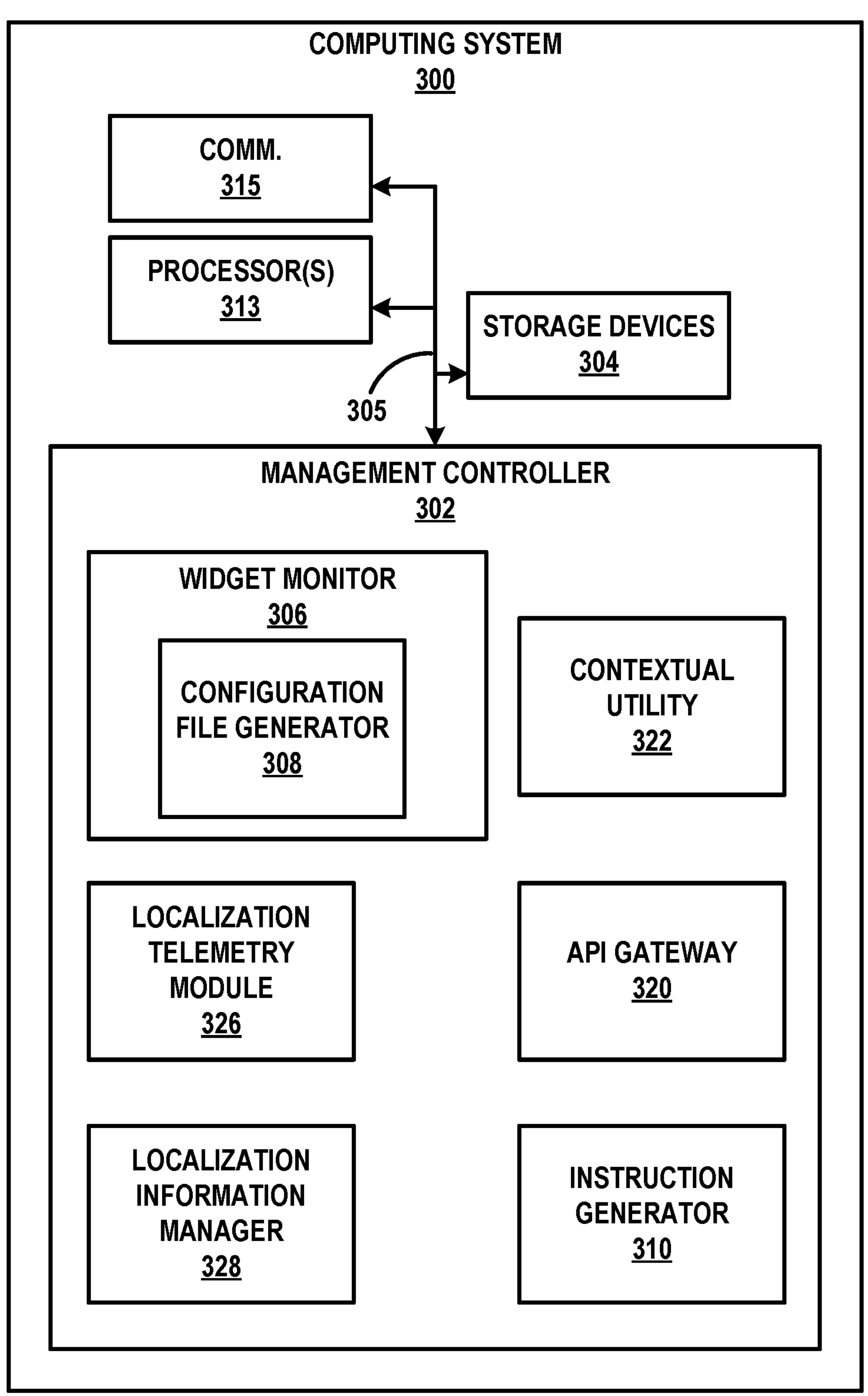
FIG. 3 is a block diagram illustrating an example computing system for managing software applications, in accordance with the techniques of this disclosure.

FIG. 3 is a block diagram illustrating example computing system 300 for managing software applications, in accordance with the techniques of this disclosure. Computing system 300 of FIG. 3 may be described as an example or alternate implementation of computing system 100 of FIG. 1 and/or computing system 200 of FIG. 2. One or more aspects of FIG. 3 may be described herein within the context of FIGS. 1 and 2 for example purposes only.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to other devices or systems. Computing system 300 may represent or be implemented through one or more virtualized computer instances (e.g., virtual machines, containers) of a cloud computing system, server farm, data center, and/or server cluster.

In the example of FIG. 3, computing system 300 may include one or more processors 313, one or more communication units 315, storage devices 304, and management controller 302. One or more of the devices, modules, storage areas, or other components of computing system 300 may be interconnected to allow for inter-component communications (e.g., physically, communicatively, and/or operatively). In some examples, such connectivity may be provided by communication channels (e.g., communication channels 312), which may represent one or more of a system bus, a network connection, an inter-process communication data structure, a cloud-based connection, or any other method for communicating data.

One or more communication units 315 of computing system 300 may communicate with devices external to computing system 300 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 300 may transmit and/or receive satellite signals on a satellite network. Examples of communication units 315 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more processors 313 of computing system 300 may implement functionality and/or execute instructions associated with computing system 300 or associated with one or more modules illustrated herein and/or described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 300 may use one or more processors 313 to perform operations in accordance with one or more aspects of the present disclosure using software, hardware, firmware, or a mixture of hardware, software, and firmware residing in and/or executing at computing system 300.

One or more processors 313 (also referred to herein as "processors 313") may provide an operating environment or platform for various modules described herein, which may be implemented as software, but may in some examples include any combination of hardware, firmware, and software. One or more processors 313 may execute instructions of one or more modules. Processors 313 may retrieve, store, and/or execute the instructions and/or data of one or more applications, modules, or software. Processors 313 may also be operably coupled to one or more other software and/or hardware components, including, but not limited to, one or more of the components of computing system 300 and/or one or more devices or systems illustrated as being connected to computing system 300.

Processors 313 may implement functionality and/or execute instructions within computing system 300. For example, processors 313 may receive and execute instructions that provide the functionality of API Gateway 320, widget monitor 306, localization telemetry module 326, contextual utility 322, localization information manager 328, and instruction generator 310. These instructions executed by processors 313 may cause computing system 300 to store and/or modify information within storage devices 304 or processors 313 during program execution. Processors 313 may execute instructions of API Gateway 320, widget monitor 306, localization telemetry module 326, contextual utility 322, localization information manager 328, and instruction generator 310 to perform one or more operations. That is API Gateway 320, widget monitor 306, localization telemetry module 326, contextual utility 322, localization information manager 328, and instruction generator 310 may be operable by processors 313 to perform various functions described herein.

Storage devices 304 within computing system 300 may store information for processing during operation of computing system 300 (e.g., computing system 300 may store data accessed by API Gateway 320, widget monitor 306, localization telemetry module 326, contextual utility 322, localization information manager 328, and instruction generator 310 during execution at computing system 300). In some examples, storage devices 304 may include temporary memory, meaning that a primary purpose of storage devices 304 are not long-term storage. Storage devices 304 of computing system 300 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 304 may include one or more computer-readable storage media, which may include, for example, memories or cloud-based storage components. Storage devices 304 may be configured to store larger amounts of information than volatile memory. Storage devices 304 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 304 may store program instructions and/or information associated with API Gateway 320, widget monitor 306, localization telemetry module 326, contextual utility 322, localization information manager 328, and instruction generator 310.

Storage devices 304 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the computing system 300. Storage devices 304 may be distributed across multiple devices or servers within a cloud computing environment provided by computing system 200.

Management controller 302 may include API Gateway 320, widget monitor 306, contextual utility 322, localization information manager 328, localization telemetry module 326, and instruction generator 310. API Gateway 320 may be an API management tool that interfaces between computing devices and software repository 170 of FIG. 2. API Gateway 320 may act as an external server that forwards requests to access a software application (e.g., reverse proxy) to accept all API calls made by client devices. In this way, API Gateway 320 may allow computing system 300 to manage software applications by acting as an interface for client devices to request the appropriate components of a software application from a software repository or content delivery network.

Computing system 300 may maintain configuration files that include configuration information for various versions of widgets. Computing system 300 may intelligently regulate which version of widgets are sent to particular requests by sending appropriate configuration files associated with configuration information for particular versions of widgets.

Widget monitor 306 may retrieve configuration information for a software application. Widget monitor 306 may receive configuration information specifying multiple widgets for deploying the software application. Widget monitor 306 may retrieve the configuration information via API Gateway 320.

In the example of FIG. 3, widget monitor 306 may include configuration file generator 308. In some instances, configuration file generator 308 may generate one or more configuration files based on configuration information retrieved from widget monitor 306. Widget monitor 306 may send the instructions to configuration file generator 308 to generate configuration files responsive to widget monitor 306 detecting a new version of a widget used to execute the software application has been uploaded. Configuration file generator 308 may generate a configuration file that includes the retrieved configuration information.

API Gateway 320 of management controller 302 may receive a request to execute a software application. In some instances, API Gateway 320 may obtain a request to execute a software application for managing an electronic document. Instruction generator 310 may prepare a response to the request to execute the software application. Instruction generator 310 may compile necessary configuration files for widgets used to execute the requested software application. Instruction generator 310 may obtain the necessary configuration files from the configuration files stored in storage devices 304. API Gateway 320 may receive telemetry information from client devices.

Instruction generator 310 generate instructions in a response to a request for a software application. For example, instruction generator 310 may generate instructions for loading widgets and data used to execute a software application. Instruction generator 310 may generate instructions to load widgets used to execute a software application. In some examples, instruction generator 310 may generate instructions in a response to a request for a software application to include localization information provided by localization information manager 328.

Localization information manager 328 may monitor localization information for each widget managed by computing system 300. Localization information manager 328 may manage localization information specifying string values for strings of widgets in various localities. Localization information manager 328 may manage localization information in a JSON-format. Localization information for widgets may be created or modified asynchronously from the development and deployment of widgets. For example, a developer team for a widget may release a new widget and/or a new version of an existing widget at a different time from when the localization information is generated. In some examples, localization information for widgets may be manually developed by a localization team. Localization information manager 328 may receive indications, with storage location information, that localization information for widgets have been created, updated, replaced, or deleted. Localization information manager 328 may send the indications with storage location information to configuration file generator 308. Configuration file generator 308 may update or otherwise include the storage location information of the created, updated, replaced, or deleted localization information in configuration files for corresponding widgets.

In some examples, management controller 302 may include localization telemetry module 326. Localization telemetry module 326 may provide an administrator of computing system 300 insight associated with localization information (e.g., localizations 266 of FIG. 2) applied to widgets executed on client devices (e.g., client devices 260 of FIG. 2). Localization telemetry module 326 may provide software developer computing devices (e.g., developer computing device 150 of FIG. 1) alerts or notifications associated with the frequency of localization information (e.g., localizations 266) applied to widgets executed on client devices (e.g., client devices 260). In some instances, localization telemetry module 326 may provide software developer computing devices (e.g., developer computing device 150) alerts or notifications associated with missing localization information for widgets of software applications. For example, localization telemetry module 325 may obtain localization telemetry information from client devices (e.g., client devices 260) indicating that localization information (e.g., localizations 266) is not available to determine a string value for a requested locality. Localization telemetry module 325 may send developer computing devices an alert or notification about the widget with missing localization information so that the developer computing device may remedy any missing localization information. Missing localization information, or localization information in general, may be asynchronously created from development and deployment of widgets. Localization information may be manually developed by localization teams based on string identifiers for widgets provided by developers of the widgets.

In accordance with the techniques of the disclosure, computing system 300 may configure a client device to render a graphical user interface with string values generated based on localization information. In some instances, instruction generator 310 may include localization information with the instructions for loading widgets and data used to execute a software application. In some examples, instruction generator 310 may generate instructions for a requesting client device to obtain localization information from a content repository (e.g., software repository 170).

Instruction generator 310 may generate instructions for a requesting client device to generate string value based on identifiers and localization information. Instruction generator 310 may generate instructions that cause a localization frame wrapper (e.g., localizations 266) to identify string identifiers of strings included in an instance of a widget for the software application. Instruction generator 310 may generate instructions that cause the localization frame wrapper to implement translation functions to generate the string values based on the localization information and identified string identifiers for the instance of the widget. For example, instruction generator 310 may generate instructions that configures a first localization frame wrapper of client device 260A to generate a first string value for a first string of a first widget based on a first string identifier and localization information. Instruction generator 310 may generate instructions that configures a second localization frame wrapper client device 260A to generate a second string value for a second string of a second widget based on a second string identifier and localization information. Similarly, instruction generator 310 may generate instructions that cause client device 260A to generate any number of string value for corresponding strings of any number of widgets of a requested software application based on string identifiers indicated in the strings of widgets and localization information.

Instruction generator 310 may output the instructions to render a graphical user interface for the requested software application. Instruction generator 310 may output the instructions to render the graphical user interface based on the string values generated based on string identifiers and localization information. Instruction generator 310 may output the instructions to render the graphical user interface to client devices (e.g., client devices 260) via API gateway 320 and/or network 101 of FIG. 1.

Figure 4:
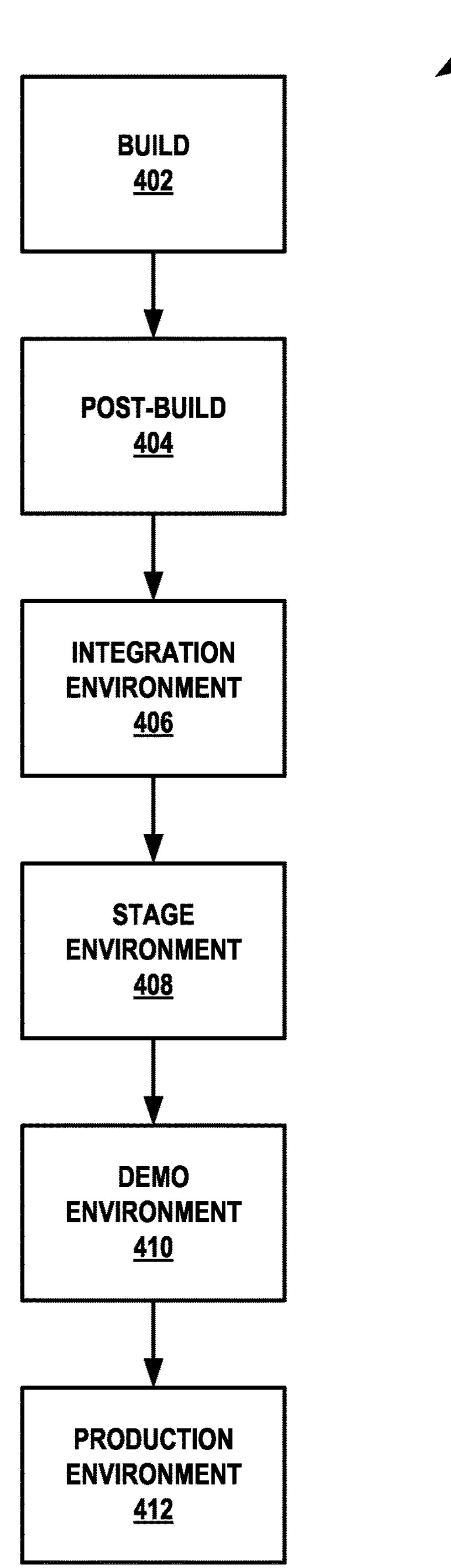
FIG. 4 is a conceptual diagram illustrating an example deployment lifecycle of a new version of a widget for a software application, in accordance with techniques of this disclosure.

FIG. 4 is a conceptual diagram illustrating an example deployment lifecycle 400 of a new version of a widget for a software application, in accordance with techniques of this disclosure. Deployment lifecycle 400 may include multiple, discrete environments associated with different stages in the deployment of a new version of a widget. In the example of FIG. 4, deployment lifecycle 400 may include build environment 402, post-build environment 404, integration environment 406, stage environment 408, demo environment 410, and production environment 412. One or more aspects of FIG. 4 may be described herein within the context of FIGS. 1-3 for example purposes only.

Build environment 402 may include a user of developer computing device 150 creating executable software code files for a new version of a widget used in implementing software applications. Build environment 402 may include the manual generation of executable programs by software developers using command line interface 152, for example. Post-build environment 404 may include developer computing device 150 executing software code files of a new version of a widget created in build environment 402. Post-build environment 404 may include a software developer locally testing a new version of a widget using command line interface 152. Integration environment 406 may include developer computing device 150 uploading a new version of a widget to software repository 170. In some instances, integration environment 406 may include computing system 100 determining whether the new version of the widget uploaded to software repository 170 was wrapped via a standardized format. In some examples, integration environment 406 may include quality assurance and/or security testing.

Stage environment 408 may include internal testing of the new version of the widget. Stage environment 408 may include software development teams mimicking behavior of consumer computing devices 260A-260N on the software developers' computing devices. In some instances, stage environment 408 may include performance testing. Stage environment 408 may include computing system 100 obtaining metrics from software developers executing the new version of the widget in various software application with consumer computing devices 260A-260N. Computing system 100 may obtain metrics such as mismatches of localities supported by different widgets for a software application. Computing system 100 may highlight or call attention to metrics, such as locality mismatches, to developers.

Demo environment 410 may include external testing and/or demonstration of a new version of a widget. Demo environment 410 may include software development teams deploying a new version of a software application to consumer computing devices 260A-260N, where consumer computing devices 260 are operated by clients of the software development team. Demo environment 410 may include only deploying a new version of widget to consumer computing devices 260 associated with a select group of clients with pre-determined access to the new version of the widget.

Production environment 412 may include the deployment of a new version of a widget to the general public and/or to subscribers with access to the widget. Production environment 412 may be the final stage of the deployment of the new version of the widget. Production environment 412 may include receiving requests for a software application implementing the widget, sending configuration information and instructions to execute the requested software application, and accessing the software application by executing widgets implemented in the software application based on received configuration information and instructions. In some instances, production environment 412 may include strict deployment configuration thresholds to determine whether the new version of the widget is being executed according to quality assurance and/or security standards associated with a consumer-ready software application.

In accordance with aspects of this disclosure, computing system 100 may manage localization information developed during stage environment 408, demo environment 410, and/or production environment 412. Computing system 100 may automatically alert or notify a localization team to develop and provide localization information for new widgets or new versions of widgets when widgets enter stage environment 408, demo environment 410, or production environment 412. In other words, computing system 100 may maintain and monitor localization information for widgets or new versions of widgets once the widgets pass integration environment 406. In some instances, computing system 100, or more specifically localization telemetry module 226, may monitor requests to apply localization information to widgets for software applications. Localization telemetry module 226 may issue notifications or alerts, in any of environments 408, 410, or 412, to the localization team or software developers about types of localization information being applied to particular widgets and/or missing localization information for widgets.

Figure 5:
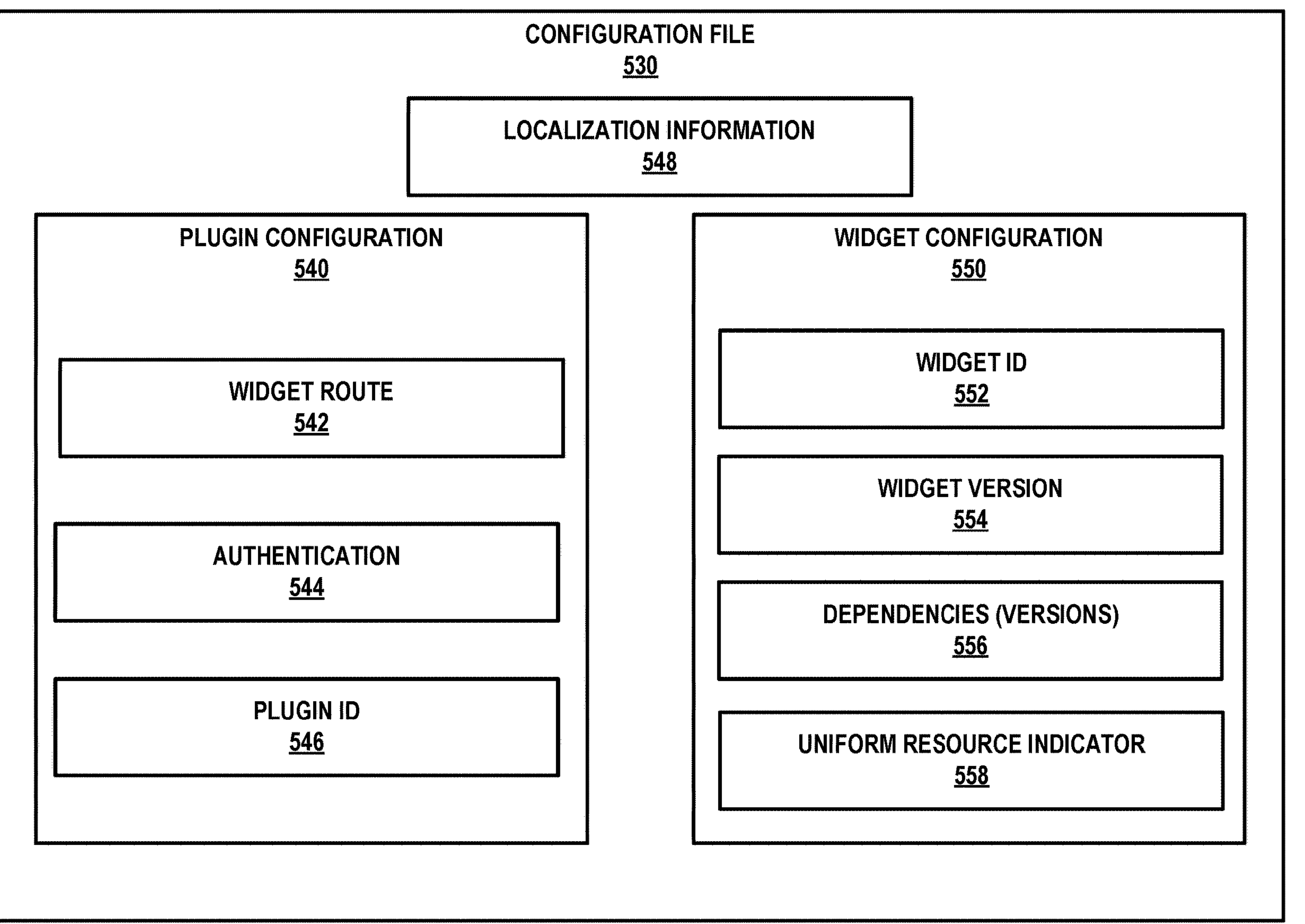
FIG. 5 is a conceptual diagram illustrating an example configuration file, in accordance with the techniques of this disclosure.

FIG. 5 is a conceptual diagram illustrating an example configuration file 530, in accordance with the techniques of this disclosure. FIG. 5 is discussed with FIGS. 1-4 for example purposes only. In some instances, configuration file generator 308 of FIG. 3 may generate configuration file 530. Configuration file generator 308 may generate configuration file 530 in response to, for example, widget monitor 306 detecting a new widget for a software application or a new version of a widget for the software application.

In the example of FIG. 5, configuration file 530 may include configuration information for a software application uploaded to software repository 170 of FIG. 1. For example, configuration file 530 may include plugin configuration 540, localization information 548, and widget configuration 550.

Localization information 548 may define string values for multiple localities. For example, localization information 548 may include a table, chart, graph, map, etc. of string values for various localities mapped to string identifiers indicated in plugins and widgets included in configuration file 530. Localization information 548 may define string values for localities, such as a United Kingdom locality, a United States locality, an Arabic locality, a French locality, a Spanish locality, etc. Localization information 548 may define string values of localities of various scopes. For example, localization information 548 may define string values for localities based on language(s) of a locality, cultural considerations of a locality, political considerations of a locality, or other considerations taken into account by a localization team tasked to develop localization information 548. In some examples, localization information 548 may include the string values for localities in JSON-format for the software application associated with configuration file 530. In some examples, localization information 548 may include a reference or indication of the location where the string values for each widget associated with the software application are stored. In accordance with the techniques of this disclosure, localization information 548 may be continuously monitored and updated based on localization telemetry information associated with requests to apply particular localities to particular widgets of a requested software application.

Plugin configuration 540 may include configuration information corresponding to a plugin associated with a software application. A plugin may be a type of widget that includes data for a graphical user interface that outputs data associated with one or more utility widgets underlying a software application. In some instances, a plugin may be a type of widget corresponding to a reference (e.g., uniform resource locator or URL) for a software application. Widget configuration 550 may include configuration information corresponding to a utility underlying functionality of the software application associated with configuration file 530. A utility widget may include a type of widget that support functionality of a software application without including a frontend user interface (e.g., a user interface). Utility widgets may be shared by different development teams due to, for example, the ensured compatibility according to the techniques described herein. Plugins and/or utility widgets may be assigned to a domain (e.g., a web domain such as domain.net) that is managed by software repository 170. References to a software application, or widgets of the software application, may be URLs that append the domain managed by software repository 170. For example, a software application may be assigned a domain of domain.net. The software application may include a widget that includes a reference to append the domain assigned to the software application, such as a reference of "/widget" that appends the domain to be "domain.net/widget."

Plugin configuration 540 may include configuration information of a plugin for a software application associated with configuration file 530. Plugin configuration 540 may include configuration information, such as widget route 542, authentication 544, and plugin identification (plugin ID) 546. An example of plugin configuration 540 is as follows:

```
{
  "route":              "/home",
  "authenticated":      {
                          "type": "SSO",
                          "clientId": "XYZ123"
```

-continued

```
                        },
  "pluginID":           "@home-team/app"
}
```

Plugin ID 546 may include configuration information specifying a reference to the plugin providing the user interface for the software application associated with configuration file 530. For example, plugin ID 546 may include a uniform resource indicator (e.g., uniform resource locator or URL) for the plugin associated with the software application. Plugin ID 546 may include the configuration information used by a requesting computing device to load the plugin for the software application associated with configuration file 530. Plugin ID 546 may include instructions for a requesting computing device to pull the plug in associated with plugin ID 546 from a software repository (e.g., software repository 170 of FIG. 1).

Authentication 544 may include configuration information indicating whether a requesting computing device has the appropriate credentials to access the software application associated with configuration file 530. In some instances, management controller 102 of FIG. 1, for example, may provide instructions to a requesting computing device to input credentials to access the software application. Management controller 102 may receive the inputted credentials from the requesting computing device. Management controller 102 may verify whether the inputted credentials match credentials with access to the software application associated with configuration file 530. Authentication 544 may include configuration information associated with whether the inputted credentials have been verified. In some examples, authentication 544 may include a Boolean value indicating that a requesting computing device has provided the verified credentials to access the software application associated with configuration file 530.

Widget route 542 may include configuration information associated with references to utility widgets that include software code for processes that execute the software application associated with configuration file 530. Widget route 542 may be associated with a particular domain hosting the software application (e.g., domain.net). In some examples, widget route 542 may include URLs associated with each utility widget used to execute the software application. Widget route 542 may include a URL appending the domain hosting the software application (e.g., /widget). Widget route 542 may include a complete URL (e.g., uniform resource locator) to a utility widget associated with widget configuration 550, such as "domain.net/widget."

Widget configuration 550 may include configuration information, such as widget identification (widget ID) 552, version 554, one or more dependencies 556 (also referred to herein as simply "dependencies 556"), and URL 558. An example of widget configuration 550 is as follows:

```
{
  "widgetID": "@prepare PDF/app",
  "version": "2.0.6"
"metadata": {
  "dependsOn": ["@PDF viewer/app"]
  "URLs" : ["preload.html", "/api/me"]
    }
}
```

Widget ID 552 may be a tag or identifier for a utility widget associated with widget configuration 550. For example, widget ID 552 may be a tag assigned to the build artifact of the utility widget that was uploaded to a software repository (e.g., software repository 170 of FIG. 1). Version 554 may include configuration information associated with a version of the utility widget used to execute the software application associated with configuration file 530. In some examples, configuration file generator 308 of FIG. 3 may define version 554 based on whether configuration file 530 is a pre-deployment configuration file or a deployment configuration file. In examples where configuration file 530 is a pre-deployment configuration file, configuration file generator 308 may define version 554 based on a version of the utility widget that is undergoing pre-deployment testing (e.g., quality assurance and/or security testing). In examples where configuration file 530 is a deployment configuration file, configuration file generator 308 may define version 554 as a version of the utility widget that has satisfied quality assurance and security requirements.

Dependencies 556 may include configuration information identifying metadata specifying which, if any, utility widgets the utility widget associated with widget configuration 550 depends on. For example, widget configuration 550 may be associated with a utility widget that depends on another utility widget. In this example, dependencies 556 may include metadata identifying a reference to dependency widgets, as well as, optionally, a version of the dependency widgets that the parent widget applies to execute processes of the software application associated with configuration file 530. In some examples, computing system 100 may generate a separate configuration file in response to a new version of a dependency widget defined in dependencies 566 being uploaded. Dependencies 556 may include a uniform resource indicator (e.g., uniform resource locator) associated with the version of the dependency widget the parent widget applies in execution of the software application. In some examples, widget configuration 550 may not include dependencies 556 if the widget associated with widget configuration 550 does not depend on any other widgets.

URL 558 may include configuration information on how to access the utility widget associated with widget configuration 550 from a software repository (e.g., software repository 170 of FIG. 1). In some instances, URL 558 may represent the URL specified in widget route 542 of plugin configuration 540. URL 558 may also represent the URL included in a widget configuration for another utility widget that depends on the widget associated with widget configuration 550. In some examples, URL 558 may represent a website URL (e.g., "domain.net/plugin/widget") that may be used by a consumer computing device to load the plugin and embedded widget associated with widget configuration 550 from a content delivery network or software repository. URL 558 provides utility widget specific configuration information that allows software developers and consumers to access a particular version of a software application from a content delivery network based on a version specified in version 554. In this way, the common knowledge base platform as described herein (e.g., computing system 100 of FIG. 1) may regulate deployment of various versions of software by intelligently sending configuration files specifying appropriate versions of widgets based on a requesting computing device. Computing system 100 may send a software developer computing device a pre-deployment configuration file that specifies untested versions of utility widgets for a requested software application, while sending consumer computing devices a deployment configuration file that specifies tested, stable versions of utility widgets for the requested software application.

In the example of FIG. 5, configuration file 530, or more specifically, for example, widget configuration 550, may specify a first widget (e.g., "@prepare PDF/app") configured to prepare an electronic document for execution by a signer. In this example, the first widget may be owned by a first developer team. Configuration file 530, or more specifically, for example, widget configuration 550, may specify a second widget (e.g., @PDF viewer/app) for presenting the electronic document to the signor. In this example, the second widget may be owned by a second developer team.

Figure 6:
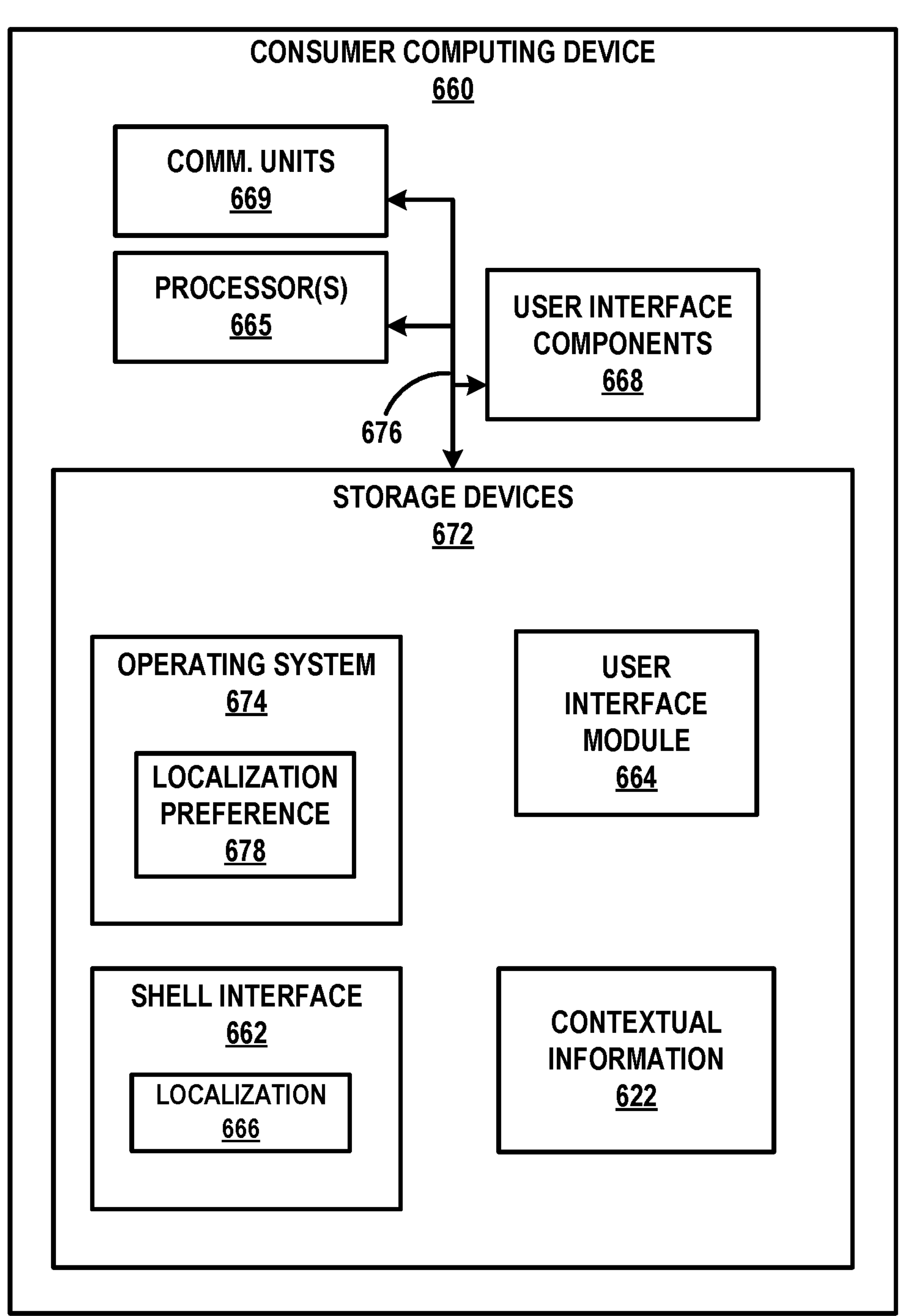
FIG. 6 is a block diagram illustrating an example consumer computing device, in accordance with the techniques of this disclosure.

FIG. 6 is a block diagram illustrating an example consumer computing device 660, in accordance with the techniques of this disclosure. FIG. 6 is discussed with FIGS. 1-5 for example purposes only. Consumer computing device 660 may be an example of consumer computing device 160 of FIG. 1 or any of client devices 260 of FIG. 2. FIG. 6 illustrates only one particular example of consumer computing device 660, and many other examples of consumer computing device 660 may be used in other instances and may include a subset of components included in example consumer computing device 660 or may include additional components not shown in FIG. 6.

In the example of FIG. 6, consumer computing device 660 may include processors 665, communication units 669, user interface (UI) components 668, and one or more storage devices 672 (also referred to herein as simply "storage devices 672"). Communication channels 676 ("COMM channel 676") may interconnect each of the processors 665, communication units 669, user interface (UI) 668, and storage device 672 for inter-component communications (physically, communicatively, and/or operatively). In some examples, communication channel 676 may include a system bus, a network connection, an inter-process communication data structure, or any other method for communicating data.

In some examples, UI components 668 may include a presence-sensitive display, a monitor, a keyboard, a mouse, etc. configured to detect input (e.g., touch and non-touch input) from a user of consumer computing device 660. UI components 668 may output information to a user in the form of a graphical user interface, which may be associated with functionality provided by consumer computing device 660. Such graphical user interfaces may be associated with computing platforms, operating systems, applications, and/or services executing at or accessible from consumer computing device 660 (e.g., electronic message applications, chat applications, Internet browser applications, mobile or desktop operating systems, social media applications, electronic games, menus, and other types of applications).

Processors 665 may implement functionality and/or execute instructions within consumer computing device 660. For example, processors 665 may receive and execute instructions that provide the functionality of shell interface 662, operating system (OS) 674, and user interface (UI) module 664. These instructions executed by processors 665 may cause consumer computing device 660 to store and/or modify information within storage devices 672 or processors 665 during program execution. Processors 665 may execute instructions of shell interface 662, OS 674, and UI module 164 to perform one or more operations. That is shell interface 662, OS 674, and UI module 664 may be operable by processors 665 to perform various functions described herein.

In the example of FIG. 6, communication units 669 of consumer computing device 660 may communicate with one or more external devices via one or more wired and/or wireless networks by transmitting and/or receiving network signals on the one or more networks. Examples of communication units 669 include a network interface card (e.g., such as an Ethernet card), an optical transceiver, a radio frequency transceiver, a GNSS receiver, or any other type of device that can send and/or receive information. Other examples of communication units 669 may include short wave radios, cellular data radios (for terrestrial and/or satellite cellular networks), wireless network radios, as well as universal serial bus (USB) controllers.

In the example of FIG. 6, storage devices 672 may include operating system (OS) 674 shell interface 662, UI module 664, and contextual information 622. Storage devices 672 within consumer computing device 660 may store information for processing during operation of consumer computing device 660 (e.g., consumer computing device 660 may store data accessed by shell interface 662 and OS 674 during execution at consumer computing device 660).

Examples of memories include magnetic hard discs, optical discs, floppy discs, flash memories, or forms of electrically programmable memories (EPROM) or electrically erasable and programmable (EEPROM) memories. Storage devices 672 may store program instructions and/or information associated with shell interface 662, OS 674, and UI module 664.

Storage devices 672 may include OS 674, which may be configured to control an operation of components of consumer computing device 660. OS 674 may include software that manages hardware and software resources of consumer computing device 660. For example, OS 674 may include software that manages locality preferences for software executed by consumer computing device 660. OS 674 may facilitate the communication of shell interface 662 with processors 665, storage devices 672, and communication units 669. In some examples, OS 674 may manage interactions between software applications and a user of consumer computing device 660. OS 674 may have a kernel that facilitates interactions with underlying hardware of consumer computing device 660 and provides a fully formed application space capable of executing a wide variety of software applications having secure partitions in which each of the software applications executes to perform various operations. In some examples, UI components 668 may be considered a component of OS 674.

In the example of FIG. 6, OS 674 may include localization preference 678. Localization preference 678 may include configurations, settings, or preferences indicating a default or desired locality (e.g., United States locality, United Kingdom locality, French locality, Arabic locality, Spanish locality, etc.) of consumer computing device 660. In some instances, OS 674 may be configured to provide localization preference 678 to shell interface 662 directly. For example, OS 674 may identify a locality specified by the user for the OS 674. In some examples, OS 674 may provide shell interface 662 an indication of multiple localities OS 674 has been configured with. In this way, shell interface 662, or more specifically localization 666, may determine which fall back string values to generate based on any locality OS 674 has been configured with.

Storage devices 672 may include shell interface 662. Shell interface 662 may include a website browser interface, an application programming interface provided by OS 674, a command line interface, or the like. Shell interface 662 may include instructions on how to request software applications from computing system 100. In some examples, shell interface 662 may include instructions on how to execute a software application requested from computing system 100.

Consumer computing device 660 may execute a software application for managing electronic documents. For example, shell interface 662 of computing device 660 may send a request (e.g., an HTML request) to computing system 100 to access a software application implemented with multiple widgets. Shell interface 662 may send a request to computing system 100 for access to a software application with communication units 669. Communication units 669 may receive a response generated by computing system 100 that includes configuration information associated with widgets implemented in the software application, as well as instructions to execute the software application. Communication units 669 may relay the response generated by computing system 100 to shell interface 662 via communication channels 676. Shell interface 662 may generate contextual information 622 for widgets using the instructions.

In the example of FIG. 6, shell interface 662 may include localization 666. Localization 666 may include an example of localization 266 of FIG. 2. In accordance with the techniques described herein, localization 666 may be configured to obtain localization information for generating string values used in a graphical user interface for a requested software application. Localization 666 may include one or more localization frame wrappers for automatically generating string values according to a locality. In some instances, localization 666 may generate string values according to the locality indicated in localization preference 678 of OS 674. In some examples, localization 666 may generate string values according to a locality selected by a user. For example, UI components 668 may detect an indication of a user selecting a locality to display the software application (e.g., via a browser option provided by shell interface 662) and send the indication to UI module 664. UI module 664 may relay the indication to shell interface 662. Shell interface 662, or more specifically localization 666, may apply a localization frame wrapper with translation functions for each instance of each widget for a software application to generate string values according to the selected locality.

Shell interface 662 may apply a localization frame wrapper for each instance of each widget for the software application. Shell interface 662 may not rely on re-downloading, re-running, or otherwise re-executing the software application or instances of widgets for the software application. Rather, shell interface 662 may implement one or more localization frame wrappers for instances of widgets without relying on the widgets for the software application directly providing localization information or translations for string identifiers in various localities.

FIG. 7 is a conceptual diagram illustrating example contextual information 720 for loading a software application, in accordance with the techniques of this disclosure. FIG. 7 is discussed with reference to FIGS. 1-6 for example purposes only. In some instances, contextual information 720 may be generated by command line interface 152 of developer computing device 150 and/or shell interface 162 of consumer computing device 160, of FIG. 1. Shell interface 162, for example, may generate contextual information 720 responsive to instructions from computing system 100 of FIG. 1. Shell interface 162 may generate contextual information 720 based on received configuration information associated with a requested software application. For example, shell interface 162 may generate contextual information 720 based on a received configuration file (e.g., configuration file 530 of FIG. 5) associated with a requested software application. Shell interface 162 may generate contextual information 720 based on plugin configuration 540, for example. Shell interface 162 may generate contextual information 720 based on a utility provided by the common knowledge base platform (e.g., contextual utility 322 of FIG. 3).

In the example of FIG. 7, contextual information 720 may organize instructions to load widgets and data for a software application into domain properties. Contextual information 720 may include domain properties corresponding to a dependency hierarchy of a software application. For example, contextual information 720 may include platform properties 722, host properties 724, and children properties 726.

Platform properties 722 may include, for example, a deployment environment (e.g., demo environment 410 or production environment 412 of FIG. 4) the common knowledge base platform (e.g., computing system 100 of FIG. 1) may send configuration information to, a browser with a command line interface (e.g., shell interface 162 of FIG. 1) to access and execute the software application, data of a user account associated with the requesting computing device, an authentication state of the requesting computing device, a language preference of a user operating the requesting computing device, font information for presenting an electronic document, a runtime widget hierarchy, and utilities provided by the common knowledge base platform. In some examples, platform properties 722 may be generated based on plugin configuration information 540 of FIG. 5. In some examples, shell interface 162 may alter the platform data included in platform properties 722. For example, shell interface 162 may specify font information (e.g., size of font, color of font, etc.) for presenting an electronic document.

Host properties 724 may include information associated with feature flags included in the host widget, a configuration API of the host widget, data used to execute the host widget, and dependent functions the host widget uses. For example, host properties 724 may include host data that specifies a utility widget that includes processes for the software application. Host properties 724 may include information for shell interface 162 to load the utility widget, even before a user operating consumer computing device 160 executes the processes of the widget.

Host properties 724 may include host data associated with dependent functions the host widget uses. Host properties 724 may include information generated based on dependencies 556 of widget configuration 550, indicating where to access versions of utility widget a host widget depends on Host properties 724 may be generated based on host data such as metadata specifying a host widget (e.g., plugin). In some instances, a host widget may be a plugin that exposes an API for other widgets to apply in processes for the software application. Host properties 724 may allow the other widgets to use the API exposed by the host widget by including configuration, bootstrapping, and initialization information of the API.

Children properties 726 may include children data associated with a host widget using a child widget as a wrapper or a high order component (HOC). Children properties 726 may be generated based on widget configuration 550 of FIG. 5. For example, children properties 726 may be generated to include instructions based on contextual information associated with dependent functions the host widget uses. Children properties 726 may include information generated based on dependencies 556 of widget configuration 550, indicating where to access versions of utility widget a host widget depends on.

In accordance with the techniques described herein, shell interface 162 may execute a software application based on contextual information 720. In response to executing the software application, shell interface 162 may instruct UI module 164 to output a graphical user interface with localization information associated with a locality. Shell interface 162 may instruct UI module 164 to output the graphical user interface based at least in part on string values generated based on localization information associated with the locality and string identifiers indicated in widgets for the software application. Shell interface 164 may generate string values for string identifiers indicated in widgets for the software application. Shell interface 164 may generate string values for instances of widgets for the software application based on the string identifiers and localization information associated with the locality.

Figure 8:
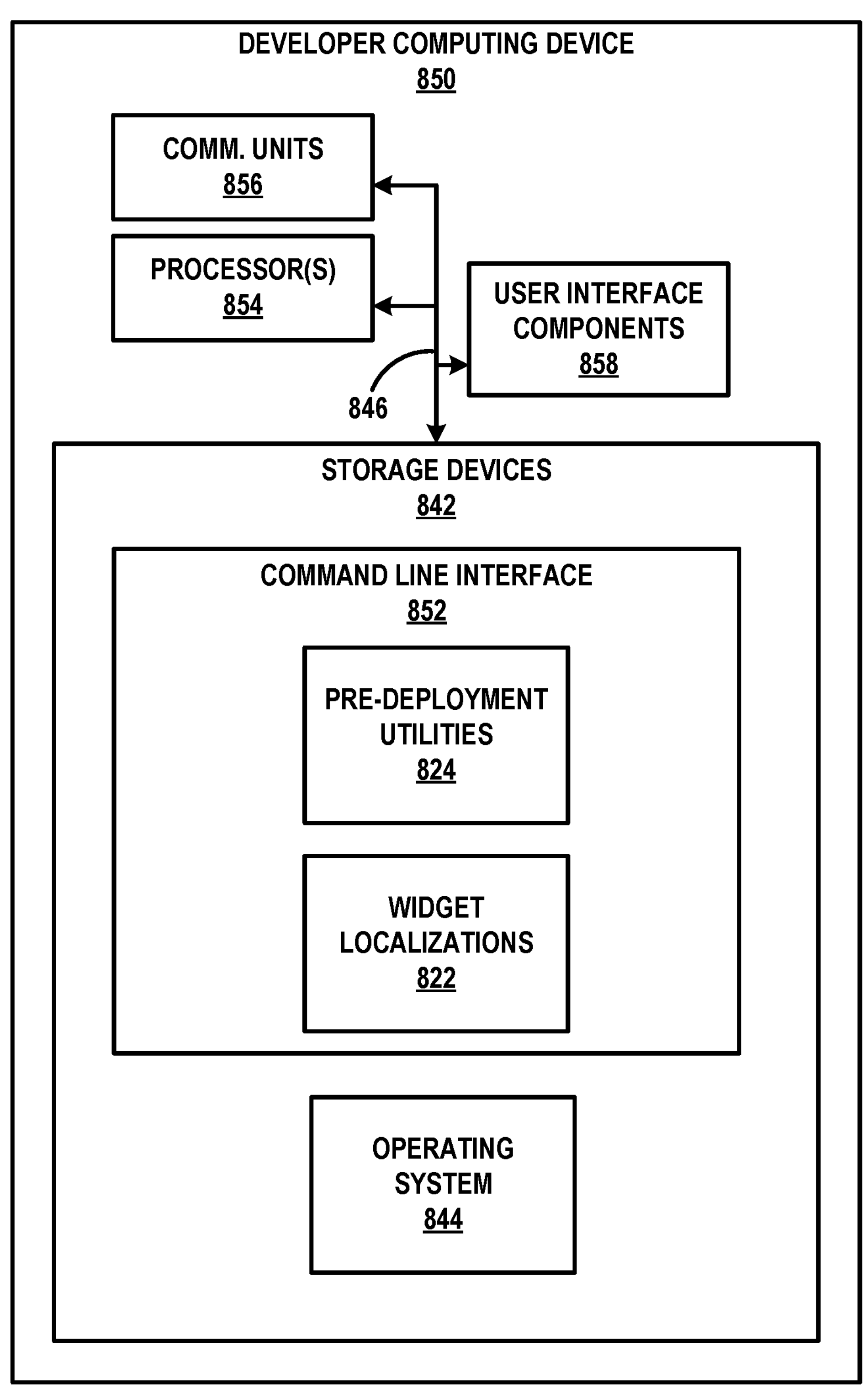
FIG. 8 is a block diagram illustrating an example developer computing device, in accordance with the techniques of this disclosure.

FIG. 8 is a block diagram illustrating an example developer computing device 850, in accordance with the techniques of this disclosure. FIG. 8 is discussed with reference to FIGS. 1-7 for example purposes only. Developer computing device 850 may be an example of developer computing device 150 of FIG. 1. FIG. 8 illustrates only one particular example of developer computing device 850, and many other examples of developer computing device 850 may be used in other instances and may include a subset of components included in example developer computing device 850 or may include additional components not shown in FIG. 8.

In the example of FIG. 8, developer computing device 850 may include processors 854, communication units 856, user interface (UI) components 858, and storage devices 842. Communication channels 846 ("COMM channel 846") may interconnect each of the components processors 854, communication units 856, UI components 858, and storage devices 842 for inter-component communications (physically, communicatively, and/or operatively). In some examples, communication channel 846 may include a system bus, a network connection, an inter-process communication data structure, or any other method for communicating data.

UI components 858 may be a presence-sensitive display, a monitor, a keyboard, a mouse, etc. configured to detect input (e.g., touch and non-touch input) from a user of developer computing device 850. UI components 858 may output information to a user in the form of a UI, which may be associated with functionality provided by developer computing device 850. Such UIs may be associated with computing platforms, operating systems, applications, and/or services executing at or accessible from developer computing device 850 (e.g., electronic message applications, chat applications, Internet browser applications, mobile or desktop operating systems, social media applications, electronic games, menus, and other types of applications).

Processors 854 may implement functionality and/or execute instructions within developer computing device 850. For example, processors 854 may receive and execute instructions that provide the functionality of command line interface 852 and operating system (OS) 844. These instructions executed by processors 854 may cause developer computing device 850 to store and/or modify information within storage devices 842 or processors 854 during program execution. Processors 854 may execute instructions of command line interface 852 and OS 844 to perform one or more operations. That is storage devices 852 and OS 844 may be operable by processors 854 to perform various functions described herein.

In the example of FIG. 8, storage devices 842 may communicate with one or more external devices via one or more wired and/or wireless networks by transmitting and/or receiving network signals on the one or more networks. Examples of communication units 856 include a network interface card (e.g., such as an Ethernet card), an optical transceiver, a radio frequency transceiver, a GNSS receiver, or any other type of device that can send and/or receive information. Other examples of communication units 856 may include, for example, short wave radios, cellular data radios (for terrestrial and/or satellite cellular networks), wireless network radios, as well as universal serial bus (USB) controllers.

In the example of FIG. 6, storage devices 842 may include operating system (OS) 844 and command line interface 852. Storage devices 842 within developer computing device 850 may store information for processing during operation of developer computing device 850 (e.g., developer computing device 850 may store data accessed by command line interface 852 and OS 844 during execution at developer computing device 850). In some examples, storage devices 842 may be a temporary memory, meaning that a primary purpose of storage devices 842 is not long-term storage. Storage devices 842 on developer computing device 850 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 842 may include one or more computer-readable storage media. Storage devices 842 may be configured to store larger amounts of information than volatile memory. Storage devices 842 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 842 may store program instructions and/or information associated with command line interface 852 and OS 844.

Storage devices 842 may include OS 844. OS 844 may control the operation of components of developer computing device 850. For example, OS 844 may facilitate the communication of command line interface 852 with processors 854, storage devices 442, and communication units 856. In some examples, OS 844 may manage interactions between software applications and a user of developer computing device 850. OS 844 may have a kernel that facilitates interactions with underlying hardware of developer computing device 850 and provides a fully formed application space capable of executing a wide variety of software applications having secure partitions in which each of the software applications executes to perform various operations. In some examples, UI components 858 may be considered a component of OS 844.

Storage devices 842 may include command line interface 852. Command line interface 852 may include a shell interface, a software development kit, an application programming interface, or any other interface a software developer can use to create and execute software code. In the example of FIG. 8, command line interface 852 may include pre-deployment utilities 824 and widget localizations 622.

Command line interface 852 may upload a new version of a widget to software repository 170. Pre-deployment utilities 824 may include instructions received from computing system 100. Pre-deployment utilities 824 of command line interface 852 may output an option to a user, via UI components 858, to input deployment configuration associated with thresholds representing required performance metrics associated with a particular environment (e.g., demo environment 410 or production environment 412 of FIG. 4). Pre-deployment utilities 824 may include instructions for quality assurance and/or security testing command line interface 852 may perform on new developed widgets.

Widget localizations 822 may include alerts, notifications, statistics, etc. of localizations applied to widgets developed by developer computing device 850. For example, widget localizations 622 may include statistics, received from localization telemetry module 226 of FIG. 2, associated with the localities applied to widgets developed by developer computing device 850. In this way, widget localizations 622 provides insight to a software developer operating developer computing device 850 on how to tailor future widget development according to demographic information provided by the statistics. In some examples, widget localizations 622 may include notifications or alerts, received from localization telemetry module 226, associated with missing localization information of widgets developed by a software developer operating developer computing device 850. In this way, widget localizations 622 may provide insight to the software developer operating developer computing device 850 to take action to provide any missing localization information and to make sure that future widget development includes localization information for the one or more localities associated with the missing localization information.

Figure 9:
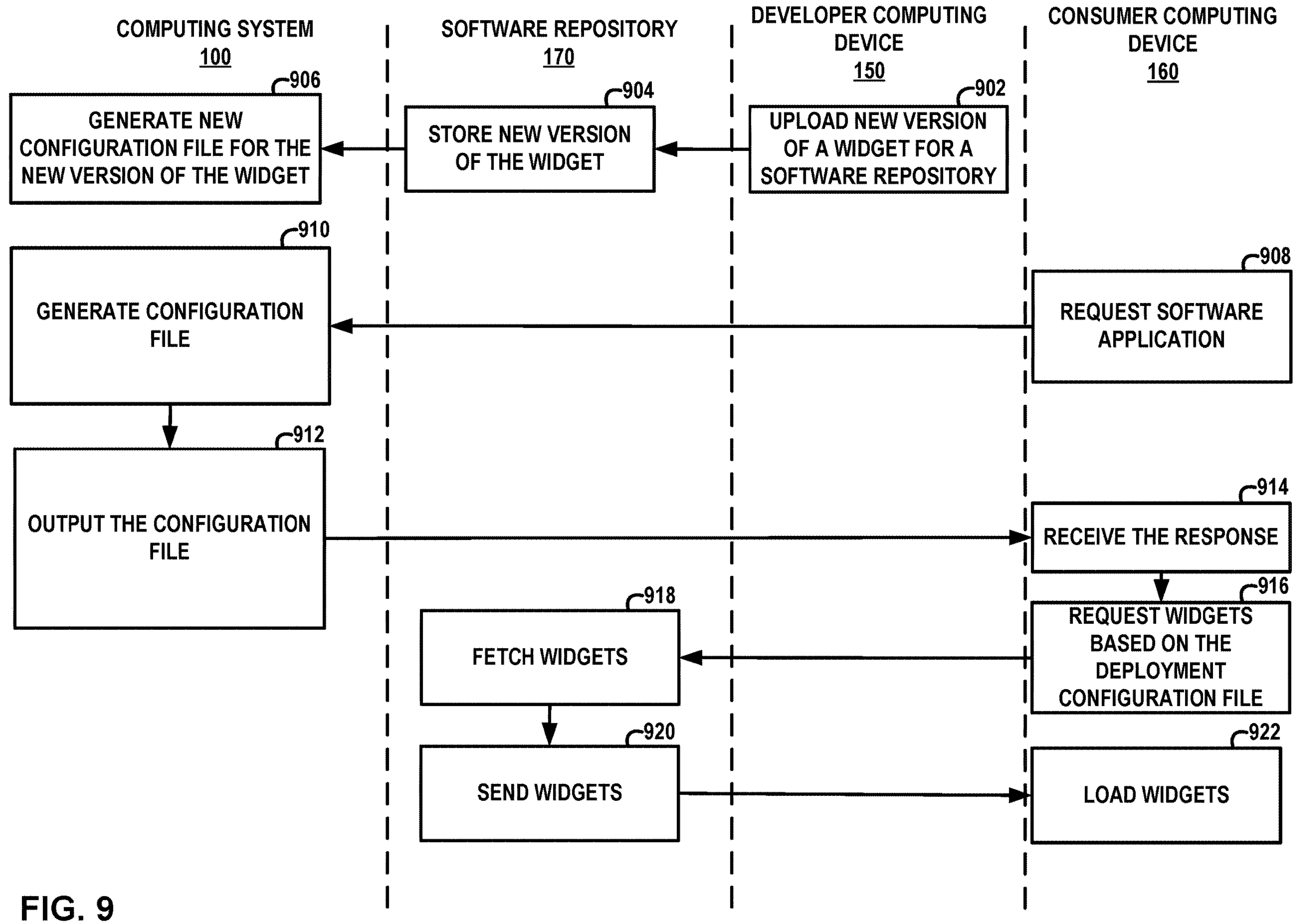
FIG. 9 is a flow chart illustrating an example process for loading widgets, in accordance with the techniques of this disclosure.

FIG. 9 is a flow chart illustrating an example process for loading widgets, in accordance with the techniques of this disclosure. FIG. 9 is discussed with FIGS. 1-8 for example purposes only. In the example of FIG. 9, computing system 100, software repository 170, developer computing device 150, and consumer computing device 160 may correspond to computing system 100, software repository 170, developer computing device 150 and consumer computing device 160 of FIG. 1.

Developer computing device 150 may upload a new version of a widget for a software application to software repository 170 (902). Developer computing device 150 may upload a new version of the widget in demo environment 410 or production environment 412 of FIG. 4. Developer computing device 150 may upload a new version of a widget that was tested using pre-deployment utilities provided by computing system 100. Developer computing device 150 may upload a new version of the widget for the software application to software repository 170 in response to the new version of the widget satisfying pre-deployment testing requirements. Developer computing device 150 may upload the new version of the widget with a command line interface (e.g., command line interface 152). In some instances, command line interface 152 may upload the new version of the widget using a utility provided by computing system 100. Command line interface 152 may use the utility to upload a build artifact that converts a new version of the widget into a standardized format. Command line interface 152 may send the build artifact of the new version of the widget to software repository 170 via network 101. Software repository 170 may store the new version of the widget for the software application (904). Software repository 170 may accordingly store the build artifact of the new version of the widget to help to ensure that all software applications stored on software repository 170 are compatible.

Computing system 100 may generate a configuration file for the new version of the widget for the software application (906). In some instances, management controller 302 may retrieve the configuration information for the new version of the widget. For example, widget monitor 306 of management controller 302 may continuously poll software repository 170 for new versions of the widget. In response to widget monitor 306 detecting software repository 170 has stored the new version of the widget, widget monitor 306 may retrieve the configuration information associated with the new version of the widget. In some examples, configuration file generator 308 may generate a deployment configuration file associated with the software application associated with a new version of the widget. Configuration file generator 308 may generate a deployment configuration file such as configuration file 530 of FIG. 5. Configuration file generator 308 may include configuration information associated with the new version of the widget as part of widget configuration 550. In some examples, the new version of the widget may be specified in dependencies 556 of widget configuration 550.

In the example of FIG. 9A, consumer computing device 160 may request access to a software application (908). Consumer computing device 160 may request access to the software application using shell interface 162. Consumer computing device 160 may be a consumer computing device requesting access to the software application to manage electronic documents. Computing system 100 may receive the request to access the software application. Computing system may receive the request to access the software application with API Gateway 220. Computing system 100, or more specifically instruction generator 210, may generate configuration file (910). In some instances, instruction generator 210 may include a preliminary threshold to determine whether the new version of the widget is compatible with the ecosystem provided by computing system 100. Instruction generator 210 may determine whether protocols and/or libraries applied in the new version of the widget are consistent with other protocols and/or libraries applied in other widgets managed by computing system 100. For example, computing system 100 may support React 17, but the new version of the widget applies React 18. Instruction generator 210 may detect the discrepancy of the version of React applied and issue a warning to developer computing device 150 to alter the new version of the widget to be compatible with the ecosystem supported by computing system 100.

Computing system 100 may output the configuration file (912). Computing system 100 may generate the response to the request that includes the deployment configuration file (e.g., configuration file 530 of FIG. 5) for the software application. Computing system 100 may generate the response to the request that includes instructions to execute the software application. Computing system 100 may send the response to consumer computing device 160 using API Gateway 220, for example. Consumer computing device 160 may receive the response with the deployment configuration file (914). In some instances, computing system 100 may generate the response with instructions for consumer computing device 160 to obtain localization information for each widget of the software application. Consumer computing device 160 may receive the response with shell interface 162.

Consumer computing device 160, or more particularly shell interface 162, may request widgets for the software application based on the deployment configuration file (916). Consumer computing device 160 may send the request to software repository 170 via network 101, for example. Consumer computing device 160 may send a request to fetch widgets based on reference indications (URLs or URLs) included in the configuration file. Software repository 170 may fetch the widgets based on the request sent from consumer computing device 160 (918). Software repository 170 may fetch the widgets for the software application based on the reference indications included in the request sent by consumer computing device 160. Software repository 170 may send consumer computing device 160 the widgets for the software application (920). Software repository 170 may send the widgets to consumer computing device 160 via network 101. Consumer computing device 160 may load the received widgets (922). Consumer computing device 160 may load and execute the received widgets according to the instructions received from computing system 100.

In some examples, consumer computing device 1160 may determine a mapping of string identifiers for each widget of the software application to the corresponding widget. Consumer computing device 1160 may determine the mapping when loading and/or executing the widgets for the software application. Consumer computing device 1160 may generate string values for each string of each instance of each widget for the software application. Consumer computing device 1160 may generate string values based on the mapping of string identifiers to strings indicated in widgets and localization information obtained via instructions from computing system 100. For example, consumer computing device 1160 may generate string values based on localization information specifying string values for string identifiers of widgets in various localities.

Figure 10:
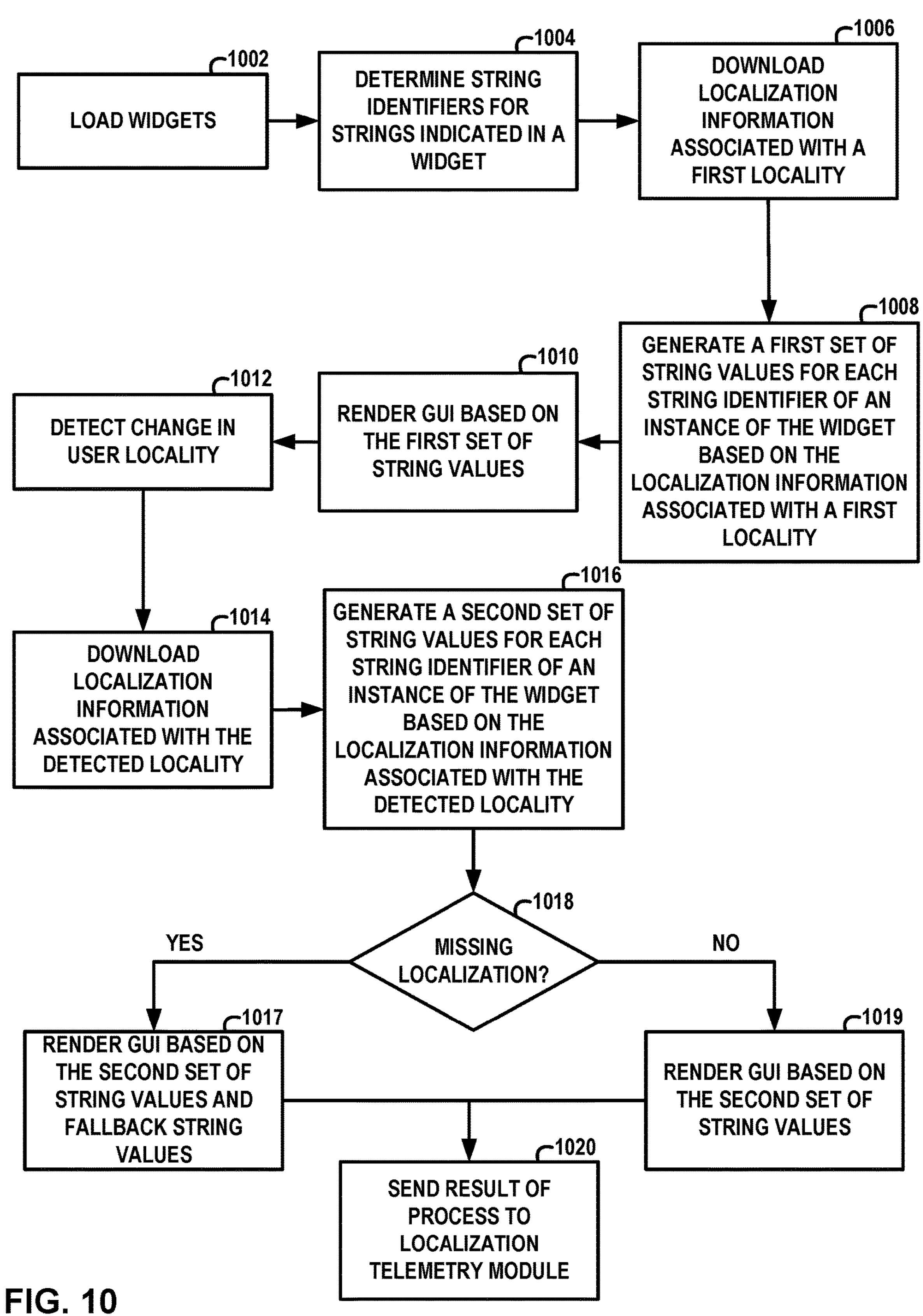
FIG. 10 is a flow chart illustrating a process for rendering a graphical user interface for a locality, in accordance with techniques of this disclosure.

FIG. 10 is a flow chart illustrating an example process for rendering a graphical user interface for a locality, in accordance with techniques of this disclosure. FIG. 10 is discussed with FIGS. 1-9 for example purposes only.

In the example of FIG. 10, computing system 100 may configure consumer computing device 160 to load widgets for a requested software application (1002). Computing system 100 may configure a shell interface of consumer computing device 160 to load widgets as described with respect to FIG. 9. Consumer computing device 160, or more specifically shell interface 162, may determine string identifiers for strings indicated in a widget for a software application (1004). For example, shell interface 162 may determine string identifiers for one or more instances of widgets for a software application. Shell interface 162 may determine string identifiers for strings that may also include a position of a string data structure in a graphical user interface associated with the software application. Shell interface 162 may determine string identifiers of a widget based on contextual information generated by the widget. In some examples, shell interface 162 may determine string identifiers of a widget based on configuration information of the widget indicating strings with corresponding string identifiers.

Shell interface 162 may download localization information associated with a first locality (1006). In some instances, shell interface 162 may download localization information for a default locality (e.g., English). In some instances, shell interface 162 may obtain the localization information from computing system 100 when receiving instructions to execute the software application. In some instances, shell interface 162 may obtain the localization information from a content repository (e.g., software repository 170) storing localization information created for the widget. Shell interface 162 may request the localization information from the content repository based on configuration information associated with the widget (e.g., localization information 548). Shell interface 162 may obtain localization information for an English locality that maps string identifiers for the widget to English locality string values. Shell interface 162 may download the localization information in response to a determination that the localization information is assigned to a locality associated with consumer computing device 160.

Shell interface 162 may generate a first set of string values for each string identifier of an instance of the widget based on the localization information associated with the first locality (1008). Shell interface 162 may generate the first set of string values based on localization information assigned to the first locality. Shell interface 162 may implement a localization frame wrapper to generate string values for the instance of the widget. Shell interface 162 may implement a localization frame wrapper with translation functions. Shell interface 162 may input determined string identifiers for the widget and the obtained localization information as parameters of the translation functions to generate string values according to the first locality (e.g., English locality). Consumer computing device 160 may render a graphical user interface (GUI) based on the first set of string values (1010). For example, shell interface 162 may instruct UI module 164 to render the graphical user interface and output the graphical user interface to a display device of consumer computing device 1650.

Consumer computing device 160 may detect a change in locality (1012). For example, shell interface 162 may obtain an indication of a second locality selected by a user operating consumer computing device 160. Shell interface 162 may determine whether widgets for the software application support the detected, second locality. Shell interface 162 may download localization information associated with the detected locality (1014). In some instances, shell interface 162 need not re-download the localization information for the widget if localization information associated with the detected locality has already been downloaded. Shell interface 162 may generate a second set of string values for each string identifier of an instance of the widget based on the localization information associated with the detected locality (1016).

Shell interface 162 may determine whether there is missing localization information for the widget (1018). Shell interface 162 may determine that localization information is missing a mapping for one or more strings of a widget. For example, shell interface 162 may determine there is a missing string value for a locality or that there is a missing string identifier included in the widget but not in the localization information. In response to shell interface 162 determining there is no missing localization information for the widget, shell interface 162 may instruct UI module 164 to render a GUI based on the second set of string values (1019) (NO branch 1018). In response to shell interface 162 determining there is missing localization information for the widget, shell interface 162 may instruct UI module 164 to render a GUI based on the second set of string values and fallback string values (1017) (YES branch 1018). In some instances, shell interface 162 may send the result of steps 1002-1018 to localization telemetry module 226 (1020). For example, shell interface 162 may send localization telemetry module 226 an indication that localization information is missing a mapping for one or more strings.

Figure 11:
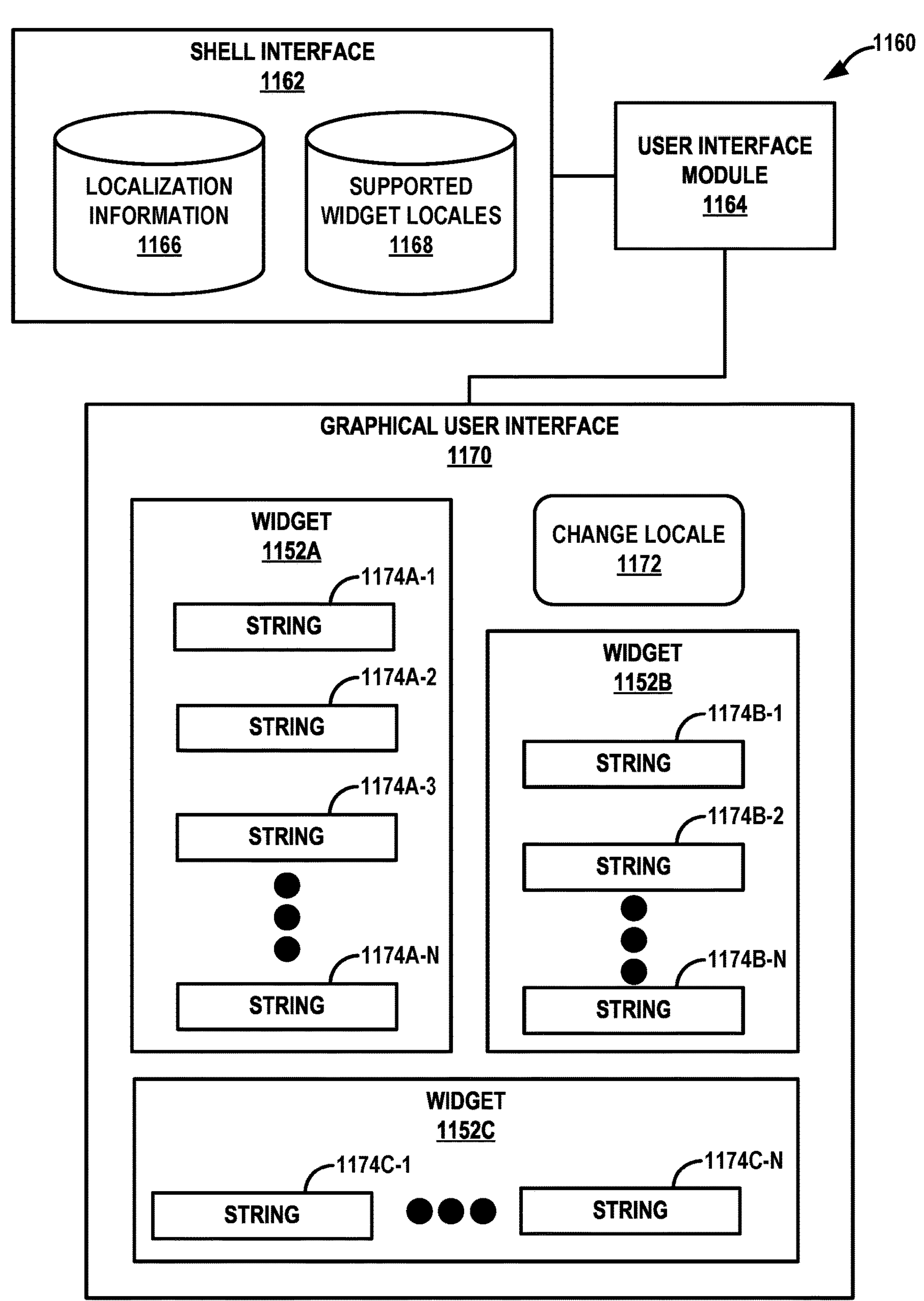
FIG. 11 is a conceptual diagram illustrating an example client device rendering a graphical user interface for a locality, in accordance with the techniques of this disclosure.

FIG. 11 is a conceptual diagram illustrating example client device 1160 rendering a graphical user interface for a locality, in accordance with the techniques of this disclosure. FIG. 11 is discussed with FIGS. 1-10 for example purposes only. In the example of FIG. 11, client device 1160, shell interface 1162, and UI module 1164 may be example implementations of consumer computing device 160, shell interface 162, and UI module 164 of FIG. 1, respectively. Client device 1160, in the example of FIG. 11, may include graphical user interface 1170. Graphical user interface 1170 may include data output by UI module 1164 via a display device (e.g., presence sensitive display, monitor, etc.). Localization information 1166 and/or supported widget locales 1168 may be example implementations of storage devices 672 of FIG. 6.

Computing system 100, for example, may configure shell interface 1162 to execute a software application. In the example of FIG. 11, shell interface 1162 may be configured to execute a software application that loads at least widget 1152A, widget 1152B, and/or widget 1152C (collectively referred to herein as "widgets 1152"). Computing system 100 may configure shell interface 1162 to retrieve widgets 1152 from a content repository (e.g., software repository 170 of FIG. 1) based on configuration information provided by computing system 100. Shell interface 1162 may be configured to load widgets 1152 for execution of the software application by generating contextual information associated with properties and data for the execution of widgets 1152.

Shell interface 1162 may be configured to generate instructions for UI module 1164 to output graphical user interface 1170. In some instances, shell interface 1162 may be configured to generate default string values for string identifiers 1174 that may be included in graphical user interface 1170. Shell interface 1162 may generate default string values for string identifiers 1174A-1-1174A-N based on a mapping of default string values to string identifiers of widget 1152A included in localization information 1166. Shell interface 1162 may generate default string values for string identifiers 1174B-1-1174B-N based on a mapping of default string values to string identifiers of widget 1152B included in localization information 1166. Shell interface 1162 may generate default string values for string identifiers 1174C-1-1174C-N based on a mapping of default string values to string identifiers of widget 1152C included in localization information 1166. For example, shell interface 1162 may be configured to generate string values for string identifiers 1174 based default English string values maintained in localization information 1166. Shell interface 1162 may generate instructions for UI module 1164 to output graphical user interface 1170, via a display device, with the generated string values for each string identifier 1174.

In accordance with the techniques described herein, shell interface 1162 may be configured to generate string values for string identifiers of widgets based on a change in locality. Shell interface 1162 may obtain a request to change a current locality based on an input detected from a user associated with client device 1160. For example, UI module 1164 may detect a signal associated with a user selecting change locality 1172. UI module 1164 may configure change locality 1172 to include a dropdown list or other graphical control element of localities (e.g., English, Spanish, French, etc.). UI module 1164 may detect an input of a user interacting with change locality 1172 and relay the input to shell interface 1162. For example, UI module 1164 may detect an input of a user selecting a French locality via change locality 1172. UI module 1164 may send shell interface 1162 an indication that the user requests graphical user interface 1170 to be output according to the selected locality (e.g., French).

Shell interface 1162 may determine whether the selected locality is supported by each instance of each widget of a software application executing at client device 1160. In the example of FIG. 11, shell interface 1162 may determine whether widget 1152A, widget 1152B, and/or widget 1152C supported the selected locality (e.g., French). Shell interface 1162 may store supported localities for each widget associated with the software application executing at client device 1160 in supported widget locales 1168. In some instances, shell interface 1162 may obtain supported localities for each widget from a computing system managing configuration files for widgets 1152 (e.g., computing system 100 of FIG. 1). In some instances, shell interface 1162 may retrieve supported localities information for each widget from a content repository (e.g., software repository 170 of FIG. 1).

In some examples, shell interface 1162 may determine each of widgets 1152 support the selected locality. For example, shell interface 1162 may determine that widget 1152A, widget 1152B, and widget 1152C each support the selected locality based on information stored in supported widget locales 1168. For example, shell interface 1162 may determine whether widgets 1152 support the selected locality with configuration metadata associated with widgets 1152. In some examples, shell interface 1162 may determine whether widgets 1152 support the selected locality based on whether the localization information associated with widgets 1152 include string values in the selected locality. In some instances when localization information for one or more of widgets 1152 is unavailable, shell interface 1162 may download localization information from a content repository (e.g., software repository 170). Shell interface 1162 may store downloaded localization information for each instance of widgets 1152 in localization information 1166. Shell interface 1162 may generate string values for each of string identifiers 1174 based on mappings of string values to string identifiers of widgets 1152 maintained in localization information 1166.

In another example, shell interface 1162 may determine one or all of widgets 1152 do not support the selected locality. For example, shell interface 1162 may determine widget 1152A and widget 1152B support a French locality, while shell interface 1162 may determine that widget 1152C may not support the French locality. In this example, shell interface 1162 may apply a first localization frame wrapper to determine string values for string identifiers 1174A-1-1174A-N of widget 1152A based on French locality string values included in localization information 1166. Shell interface 1162 may similarly apply a second localization frame wrapper to determine string values for string identifiers 1174B-1-1174B-N of widget 1152B based on French locality string values included in localization information 1166. In some instances, shell interface 1162 may apply a third localization frame wrapper to determine fallback string values for string identifiers 1174C-1-1174C-N. In some instances, shell interface 1162 may not maintain default string values for string identifiers 1174C-1-1174C-N.

Shell interface 1162 may notify or alert computing system 100, for example, of the result of the locality transition process. For example, shell interface 1162 may send computing system 100 an indication that all of widgets 1152 support a selected locality. Shell interface 1162 may send computing system 100 an indication of which widget of widgets 1152 do not support a selected locality. Computing system 100 may organize the indications of results of localization processes as telemetry data. Computing system 100 may use the telemetry data to inform developers of missing localization information. Computing system 100 may also use the telemetry data to provide insights to developers about how to tailor widget development according to key localities.

Figure 12A:
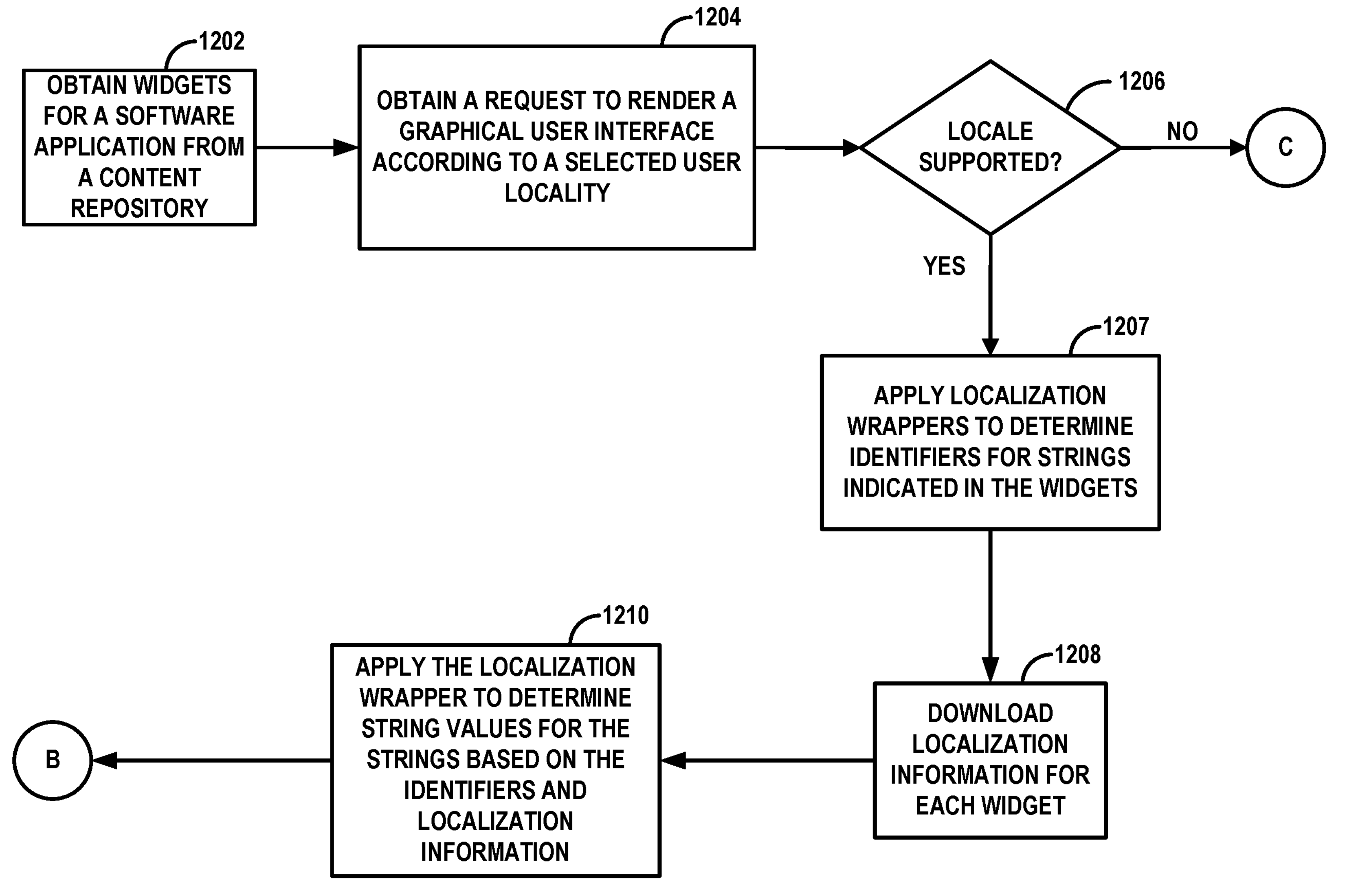
FIG. 12A is a flow chart illustrating a process for generating string values, in accordance with the techniques of this disclosure.

FIG. 12A is a flow chart illustrating a process for generating string values, in accordance with the techniques of this disclosure. FIG. 12A is discussed with FIGS. 1-11 for example purposes only.

Shell interface 162 may obtain widgets for a software application from a content repository (e.g., software repository 170) (1202). Shell interface 162 may obtain a request to render a graphical user interface according to a selected locality (1204). Shell interface 162 may determine a locality from a plugin or browser setting. For example, shell interface 162 may obtain the locality specified in an operating system of consumer computing device 160. In another example, shell interface may obtain an indication of a locality selected by a user operating consumer computing device 160.

Shell interface 162 may determine whether a locality is supported (1206). Shell interface 162 may determine whether widgets support a locality based on configuration metadata associated with the widgets. For example, shell interface 162 may determine a first widget supports the locality based on metadata specifying localities the first widget supports. Shell interface 162 may determine a second widget does not support the locality based on the configuration metadata of the second widget not specifying that the widget supports the locality.

Shell interface 162 may apply localization frame wrappers to determine string identifiers for strings indicated in the widgets (1207) (YES branch 1206). Shell interface 162 may determine string identifiers for instances of widgets for a software application. Shell interface 162 may determine string identifiers based on contextual information generated by the widget. In some instances, shell interface 162 may determine string identifiers for strings indicated in widgets based on configuration information used to generate the contextual information. Shell interface 162 may download localization information for each widget (1208). Shell interface 162 may apply the localization frame wrapper to determine string values for the strings based on the string identifiers and the localization information (1210).

Figure 12B:
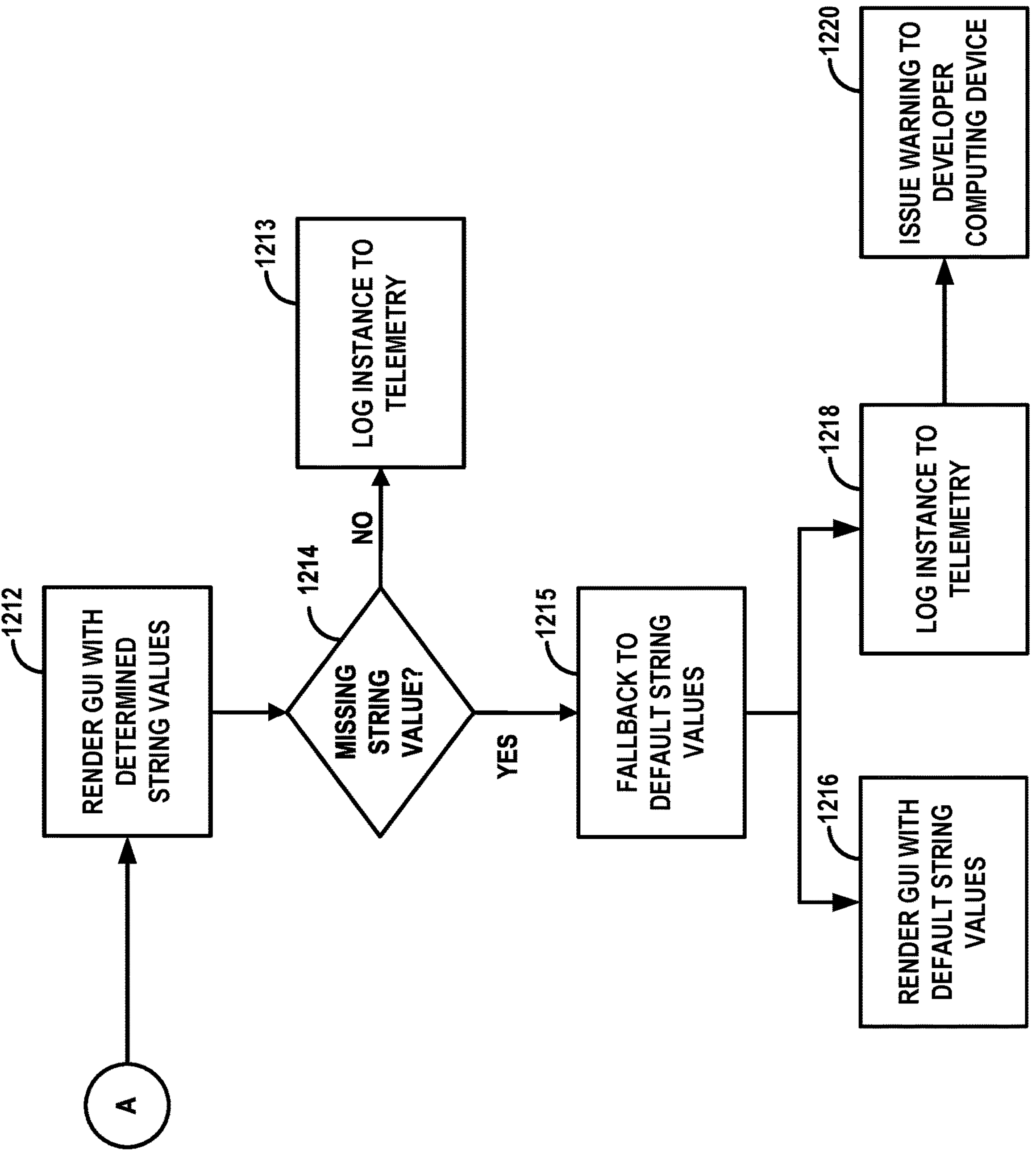
FIG. 12B is a flow chart illustrating a process for managing supported localities, in accordance with the techniques of this disclosure.

FIG. 12B is a flow chart illustrating a process for managing supported localities, in accordance with the techniques of this disclosure. FIG. 12B is discussed with FIGS. 1-12A for example purposes only.

Shell interface 162 may instruct UI module 164 to render a GUI with the string values determined in step 1210 of FIG. 12A (1212). Shell interface 162 may determine whether there are missing string values (1214). For example, shell interface may be configured to determine localization information is missing a mapping of a string identifier to a string value in a requested locality.

In response to shell interface 162 determining there are no missing string values, shell interface 162 may log the localization instance to localization telemetry module 226 (1213) (NO branch 1214). In response to shell interface 162 determining there are one or more missing string values, shell interface 162 may fallback to default string values (1215) (YES branch 1214). Shell interface 162 may instruct UI module 164 to render the GUI with default string values (1216). Shell interface 162 may log the localization instance to localization telemetry module 226 (1218). Localization telemetry module 226 may issue a warning to developer computing device 150 (1220).

Figure 12C:
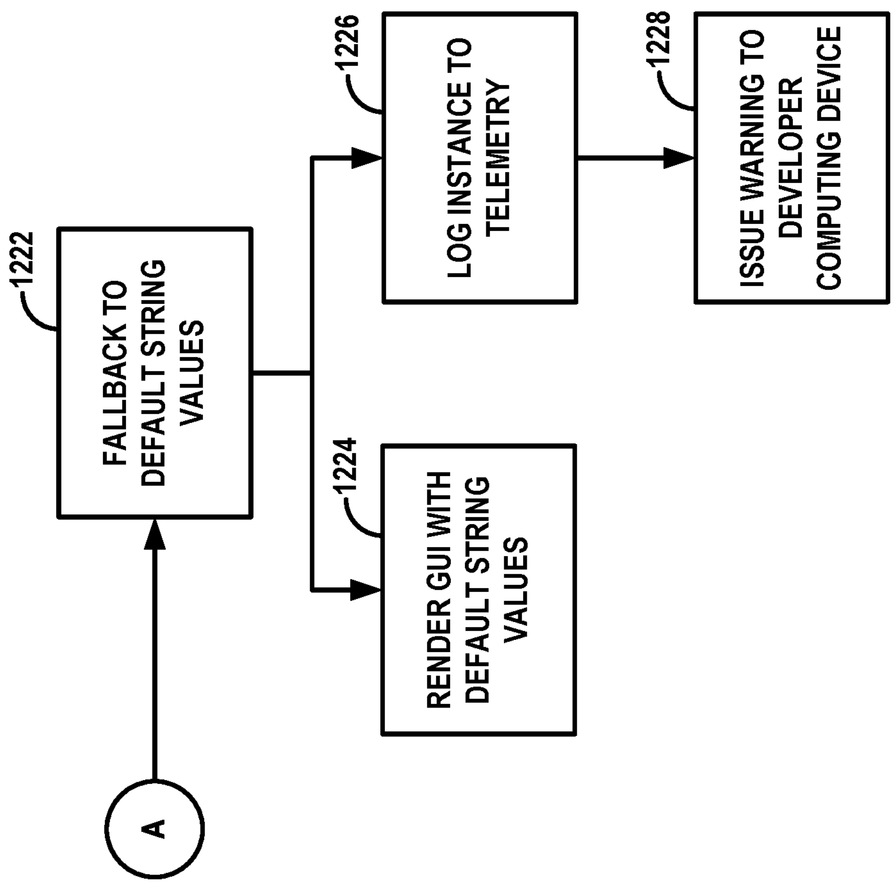
FIG. 12C is a flow chart illustrating a process for managing unsupported localities, in accordance with the techniques of this disclosure.

FIG. 12C is a flow chart illustrating a process for managing unsupported localities, in accordance with the techniques of this disclosure. FIG. 12C is discussed with FIGS. 1-12A for example purposes only. Shell interface 162 may fallback to default string values in response to a widget not supporting a selected locality (1222). Shell interface 162 may instruct UI module 164 to render the GUI with default string values (1224). Shell interface 162 may log the localization instance to localization telemetry module 226 (1226). Localization telemetry module 226 may issue a warning to developer computing device 150 (1228).

Figure 12D:
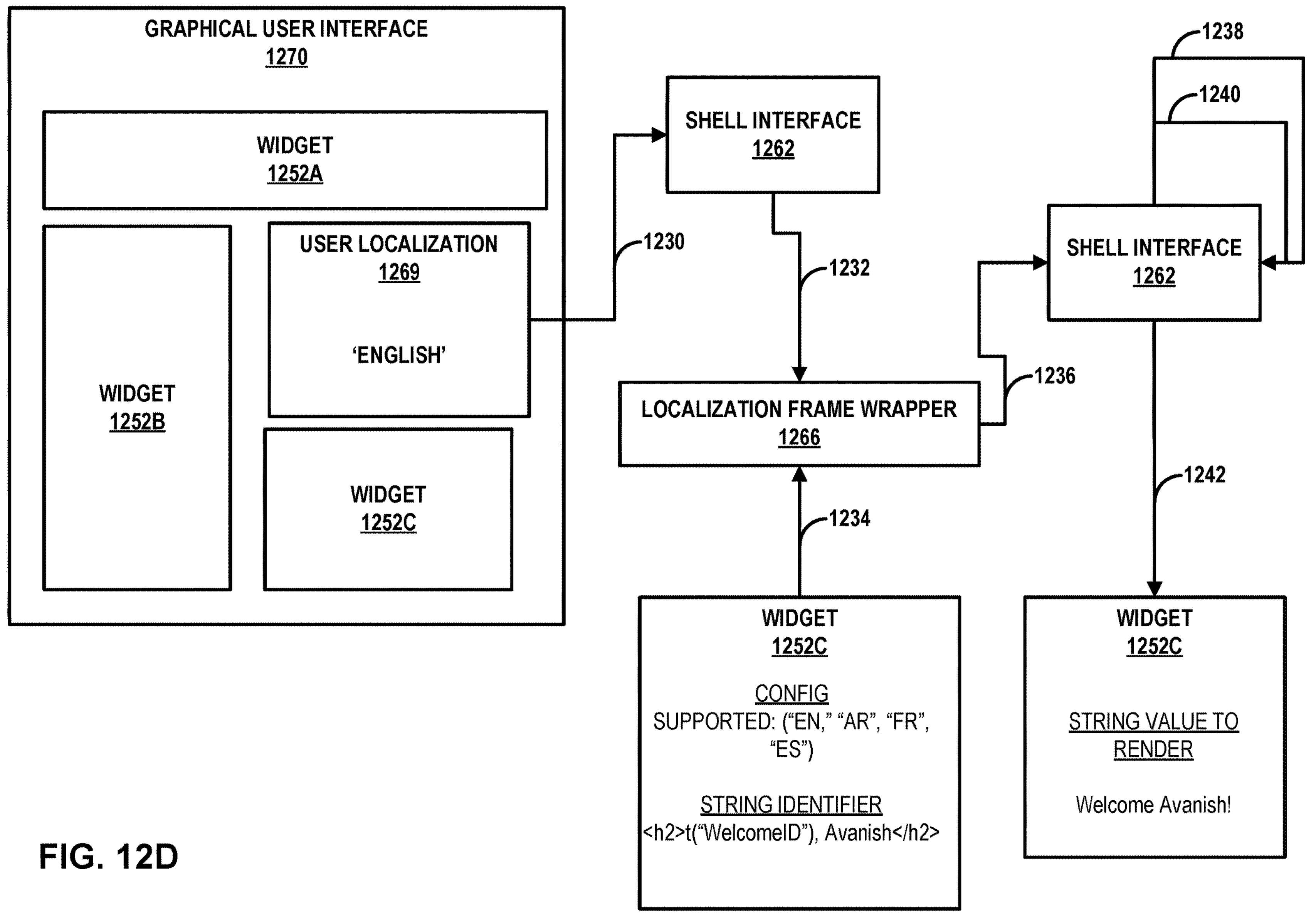
FIG. 12D is a conceptual diagram illustrating an example implementation of generating a string value for an instance of a widget, in accordance with the techniques of this disclosure.

FIG. 12D is a conceptual diagram illustrating an example implementation of generating a string value for an instance of a widget, in accordance with the techniques of this disclosure. FIG. 12D is discussed with FIGS. 1-11 for example purposes only. In the example of FIG. 12D, graphical user interface 1270, shell interface 1262, and widgets 1252, may include examples of graphical user interface 1170, shell interface 1162, and widgets 1152 of FIG. 11, respectively. User localization 1269 and localization frame wrapper 1266 may be an example of localization preference 678 and localization 666 of FIG. 6, respectively.

Shell interface 1262 may obtain an indication of a locality associated with user localization 1269 (1230). For example, shell interface 1262 may obtain a language update request for an English locality. Shell interface 1262 may determine if the locality is supported by widgets 1252 (1232). For example, shell interface 1262 may check if the English locality is supported by widget 1252C. Shell interface 1262 may determine if the locality is supported by widget 1252C based on configuration information or metadata of widget 1252C. In the example of 12D, widget 1252 may include configuration information or metadata that English, Arabic, French, and Spanish localities are supported. In response to shell interface 1262 determining a widget of widgets 1252 does not support the locality, shell interface 1262 may report an indication of the instance of missing localization information associated with the locality and the widget to computing system 100. Computing system 100 may use the indication to provide insights to developer computing device 150, for example. In response to shell interface 1262 determining widgets 1252 support the locality, shell interface 1262 may implement localization frame wrapper 1266 to generate string values for graphical user interface 1270.

During execution of a software application associated with widgets 1252 (e.g., at run-time of the software application), localization frame wrapper 1266 may use a translation function to determine string identifiers indicated in widgets 1252 (1234). For example, localization frame wrapper 1266 may determine a string identifier of "WelcomeID" based on code of widget 1252C indicating the string identifier in a header (e.g., <h2>t ("WelcomeID"), Avanish!</h2>.

Localization frame wrapper 1266 may determine the string identifier based on a parameter of a translation function included in code of widget 1252C (e.g., t ("WelcomID").

Localization frame wrapper 1266 may generate a string value for strings of widgets 1252 based on determined string identifiers (1236). To generate string values with localization frame wrapper 1266, shell interface 1262 may determine the locality for widgets 1252 (1238). In examples where a widget of widgets 1252 does not support a locality specified in user localization 1269, shell interface 1262 may determine the locality for that widget to be a locality detected as being supported by both the widget and an operating system associated with shell interface 1262 (e.g., OS 674 of FIG. 6). Shell interface 1262 may download localization information associated with the one or more determined localities of step 1238 (1240). For example, shell interface 1262 may download JSON files defining language translations for string identifiers indicated in widgets 1252 in the determined locality (e.g., an English locality). Shell interface 1262 may download localization information that includes mappings of string identifiers indicated in widgets 1252 to string values in the determined locality. Shell interface 1262 generate string values, based on the localization information, for widgets 1252 to render in graphical user interface 1270 (1242). For example, shell interface 1262 may instruct UI module 164 to render graphical user interface 1270 based at least in part on a string value of "Welcome" for the string identifier of "WelcomeID" indicated in widget 1252C. UI module 164 may output graphical user interface 1270 via a display device (e.g., presence-sensitive display, monitor, etc.) of consumer computing device 160.

Figure 13A:
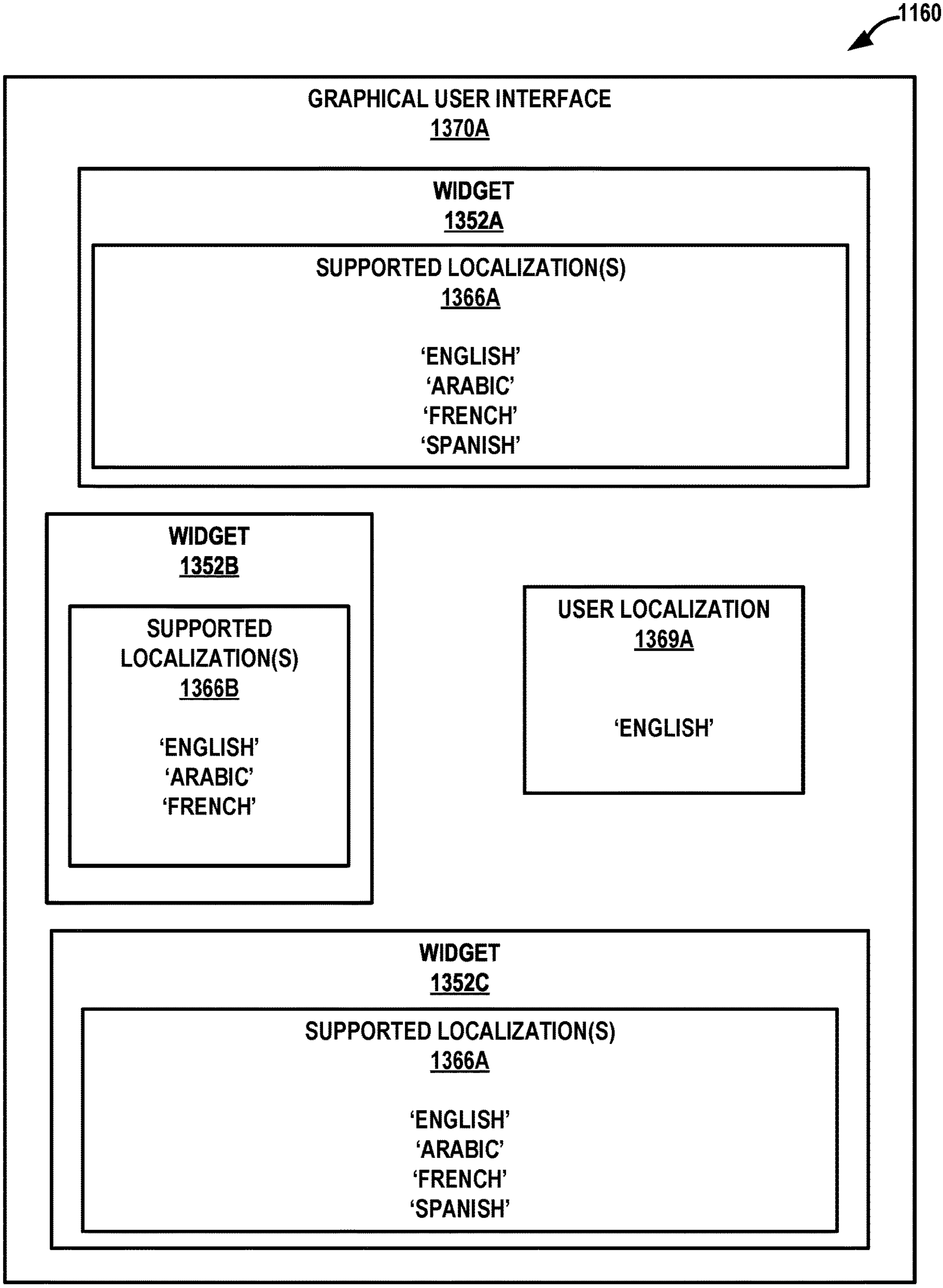
FIG. 13A is a conceptual diagram illustrating an example graphical user interface in a default locality, in accordance with the techniques of this disclosure.

FIG. 13A is a conceptual diagram illustrating example graphical user interface 1370A in a default locality, in accordance with the techniques of this disclosure. FIG. 13A is discussed with FIGS. 1-11, 12A-12D for example purposes only. In the example of FIG. 13A, graphical user interface 1370A, widget 1352A, widget 1352B, and widget 1352C may be examples of graphical user interface 1170, widget 1152A, widget 1152B, and widget 1152C of FIG. 11, respectively.

In accordance with the techniques described herein, shell interface 1162 may instruct UI module 1164 to output graphical user interface 1370A according to a default locality. In the example of FIG. 13A, shell interface 1162 may determine user localization 1369A corresponding to a locality in which string values for graphical user interface 1370A should be generated according to. Shell interface 1162 may determine user localization 1369A based on preferences or settings of an operating system of client device 1160. In the example of FIG. 13A, shell interface 1162 may determine that user localization 1369A is an 'English' locality.

In some instances, shell interface 1162 may determine whether each instance of widgets 1352 support the locality specified in user localization 1369A. Shell interface 1162 may determine whether instances of widgets 1352 support the locality specified in user localization 1369A based on supported localizations 1366. Supported localization 1366 may be included in metadata of each instance of widgets 1352. In some instances, supported localization 1366 may be included in metadata of a localization frame wrapper. In some instances, supported localization 1366 may be stored individually within a storage device of client device 1160 (e.g., supported widget locales 1168). In the example of FIG. 13A, shell interface 1162 may determine that user localization 1369A specifying an English locality is supported by widget 1352A, widget 1352B, and widget 1352C. Shell interface 1162 may determine string values for each string identifier for each instance of widgets 1352 based on localization information specifying English string values for corresponding string identifiers.

Figure 13B:
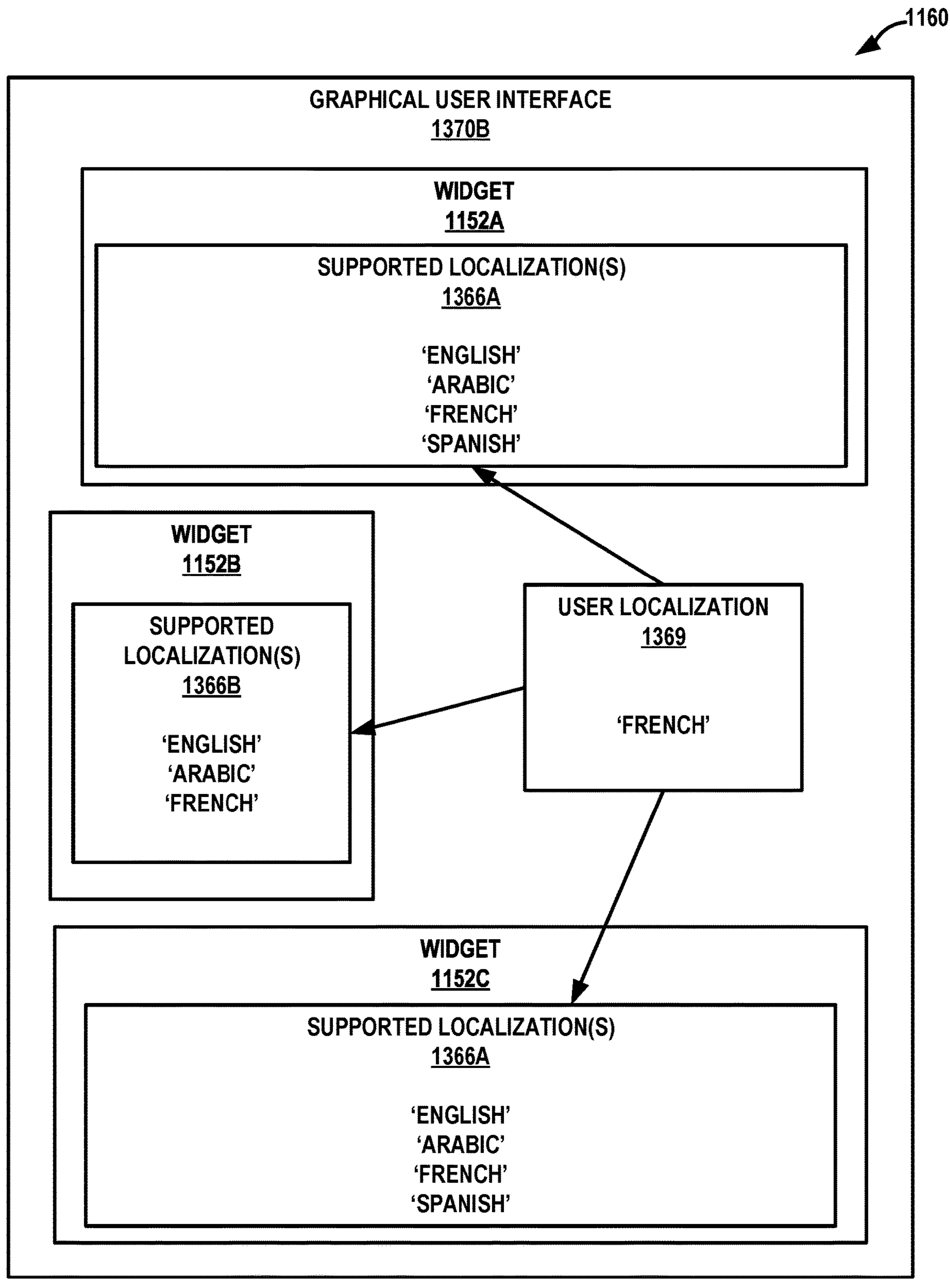
FIG. 13B is a conceptual diagram illustrating an example graphical user interface changing to a supported locality, in accordance with the techniques of this disclosure.

FIG. 13B is a conceptual diagram illustrating example graphical user interface 1370B changing to a supported locality, in accordance with the techniques of this disclosure. FIG. 13B is discussed with FIGS. 1-11, 12A-12D, 13A for example purposes only. In the example of FIG. 13B, graphical user interface 1370B, widget 1352A, widget 1352B, and widget 1352C may be examples of graphical user interface 1170, widget 1152A, widget 1152B, and widget 1152C of FIG. 11, respectively.

Shell interface 1162 may detect a change in user localization 1369. In some instances, shell interface 1162 may detect a change in user localization 1369 based on an input received from a user operating client device 1160 indicating the user wants graphical user interface 1370B to be output with string values associated with a different locality compared to a default locality. In the example of FIG. 13B, shell interface may detect that a user has selected a French locality as user localization 1369.

In accordance with the techniques described herein, shell interface 1162 may instruct UI module 1164 to output graphical user interface 1370B according to a change in locality preferences. Shell interface 1162 may determine whether each of widgets 1152 support the locality specified in user localization 1369. Shell interface 1162 may determine whether widgets 1152 support the locality specified in user localization 1369 based on supported localizations 1366. Supported localizations 1366 may correspond to supported localizations 1366 of FIG. 13A. In the example of FIG. 13B, shell interface 1162 may determine that widget 1152A supports a French locality based on supported localizations 1366A, widget 1152B supports a French locality based on supported localizations 1366B, and widget 1152C supports a French locality based on supported localizations 1366C.

Shell interface 1162 may implement localization frame wrappers to generate string values for each instance of widgets 1152 based on localization information corresponding to the locality of user localization 1369. For example, shell interface 1162 may implement a first localization frame wrapper to generate string values for each of string identifiers 1174A of the instance widget 1152A based on localization information specifying French locality string values for each of the string identifiers 1174A. Shell interface 1162 may implement a second localization frame wrapper to generate string values for each of string identifiers 1174B of the instance widget 1152B based on localization information specifying French locality string values for each of the string identifiers 1174B. Similarly, shell interface 1162 may implement a third localization frame wrapper to generate string values for each of string identifiers 1174C of the instance widget 1152C based on localization information specifying French locality string values for each of the string identifiers 1174C. Shell interface 1162 may generate instructions for UI module 1164 to output graphical user interface 1370B with string values corresponding with the string values generated based on the French localization information applied to each instance of widget 1152. Shell interface 1162 may generate the string values for graphical user interface 1370B at runtime or execution of the software application. In this way, shell interface 1162 may seamlessly output graphical user interface 1370B with a different locality (e.g., as compared to graphical user interface 1370A) without requiring extensive loading times associated with having to re-execute or re-load the software application or widgets for the software application.

Figure 13C:
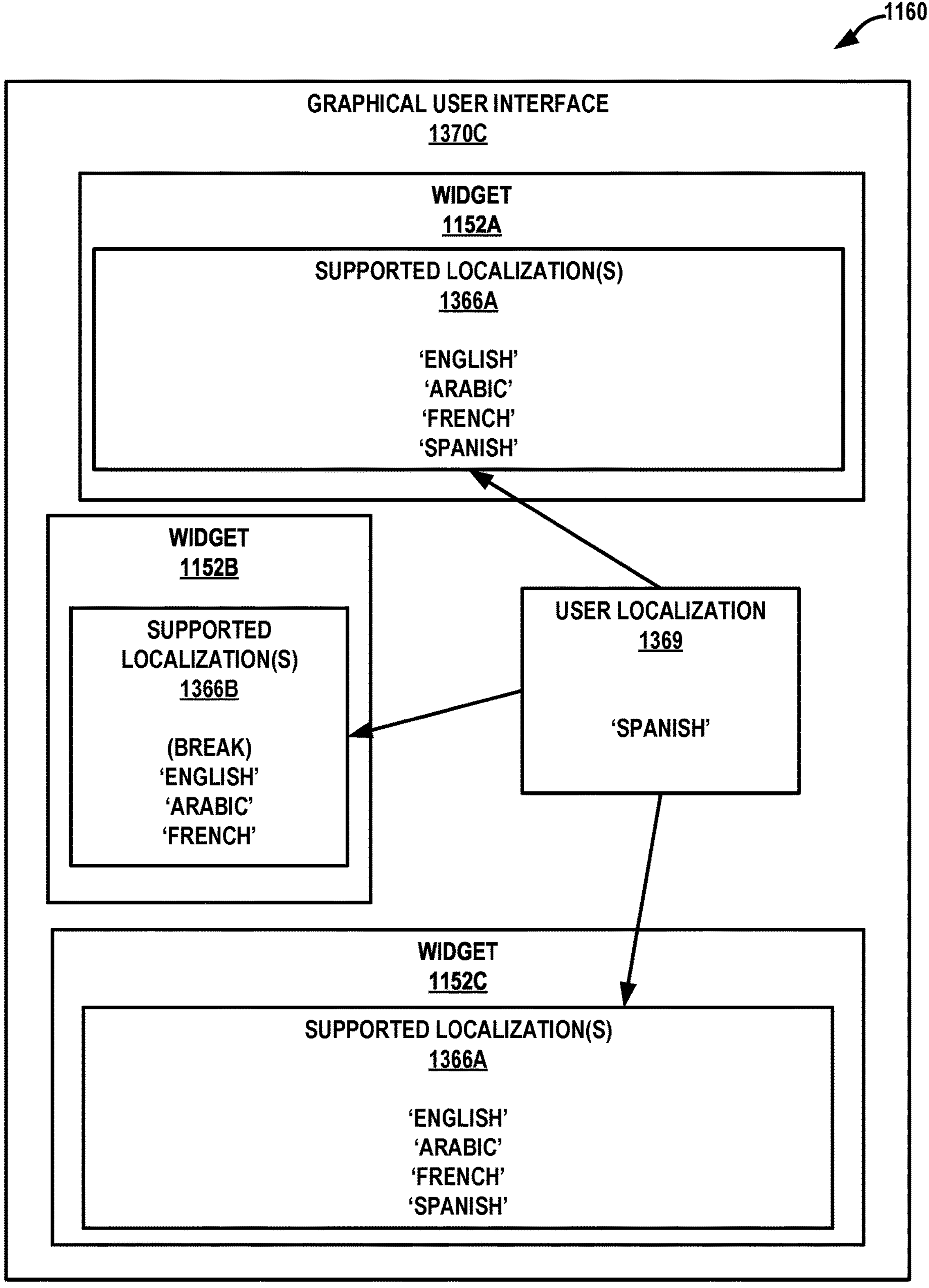
FIG. 13C is a conceptual diagram illustrating an example graphical user interface changing to an unsupported locality, in accordance with the techniques of this disclosure.

FIG. 13C is a conceptual diagram illustrating example graphical user interface 1370C changing to an unsupported locality, in accordance with the techniques of this disclosure. FIG. 13C is discussed with FIGS. 1-11, 12A-12D, 13A, 13B for example purposes only.

Shell interface 1162 may detect a change in user localization 1369. In some instances, shell interface 1162 may detect a change in user localization 1369 based on an input received from a user operating client device 1160 indicating the user wants graphical user interface 1370C to be output with string values associated with a particular locality. In the example of FIG. 13C, shell interface may detect that a user has selected a Spanish locality as user localization 1369.

In accordance with the techniques described herein, shell interface 1162 may instruct UI module 1164 to output graphical user interface 1370C according to a locality specified in user localization 1369. Shell interface 1162 may determine whether each of widgets 1152 support the locality specified in user localization 1369. Shell interface 1162 may determine whether widgets 1152 support the locality specified in user localization 1369 based on supported localizations 1366. Supported localizations 1366 may correspond to supported localizations 1366 of FIG. 13A of FIG. 13B. In the example of FIG. 13C, shell interface 1162 may determine that widget 1152A supports a Spanish locality based on supported localizations 1366A, widget 1152B does not support a Spanish locality based on supported localizations 1366B, and widget 1152C supports a Spanish locality based on supported localizations 1366C.

Shell interface 1162 may implement localization frame wrappers to generate string values for each instance of widgets 1152 based on localization information corresponding to the locality of user localization 1369. For example, shell interface 1162 may implement a first localization frame wrapper to generate string values for each of string identifiers 1174A of the instance widget 1152A based on localization information specifying Spanish locality string values for each of the string identifiers 1174A. Similarly, shell interface 1162 may implement a second localization frame wrapper to generate string values for each of string identifiers 1174C of the instance widget 1152C based on localization information specifying Spanish locality string values for each of the string identifiers 1174C. Shell interface may implement a third localization frame wrapper to generate string values for each of string identifiers 1174B of the instance of widget 1152B based on localization information specifying fallback locality string values for each of string identifiers 1174B. Shell interface 1162 may generate instructions for UI module 1164 to output graphical user interface 1370C with the generated string values.

Figure 14:
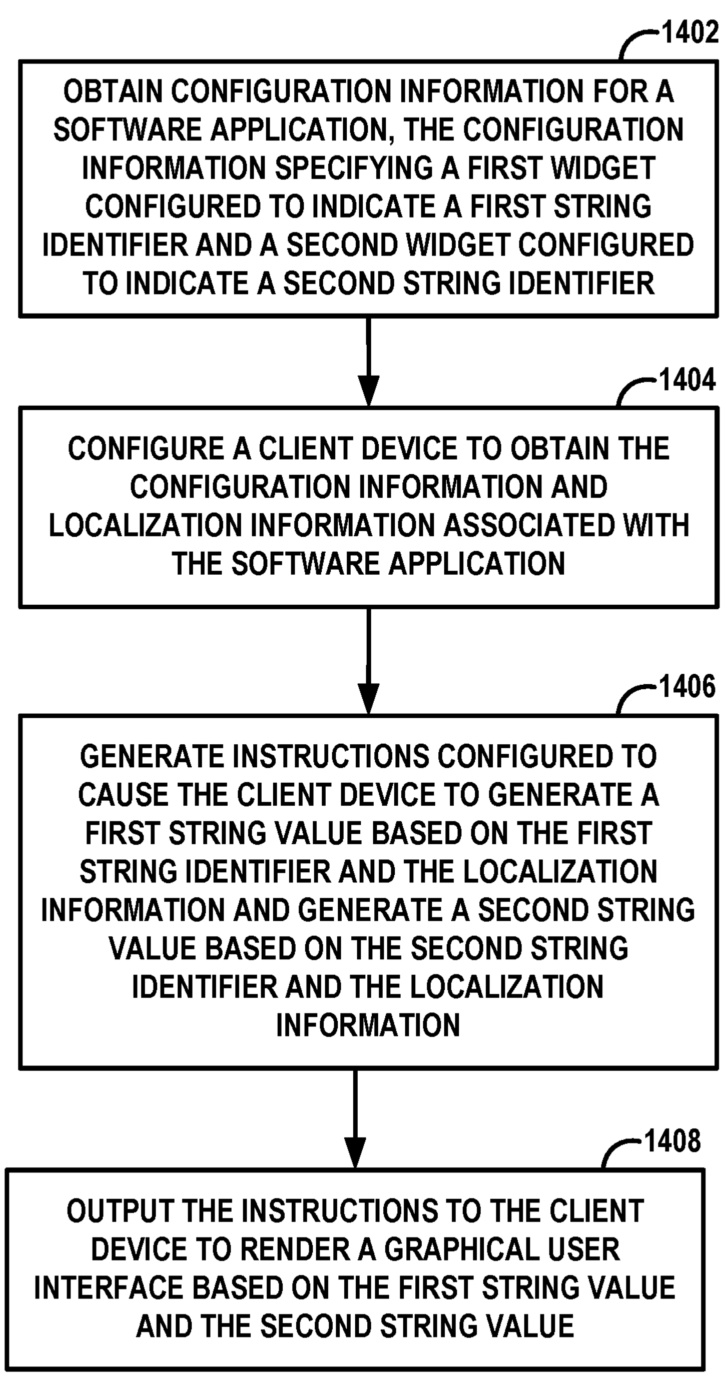
FIG. 14 is a flow chart illustrating a process for configuring a client device to output an experience based on localization information, in accordance with the techniques of this disclosure.

FIG. 14 is a flow chart illustrating a process for configuring a client device to output an experience associated with a software application and based on localization information, in accordance with the techniques of this disclosure. FIG. 14 is discussed with respect to FIGS. 1-11, 12A-12D, 13A-13C for example purposes only.

Computing system 100 may obtain configuration information for a software application, the configuration information specifying a first widget configured to indicate a first string identifier for a first string and a second widget configured to indicate a second string identifier for a second widget (1402). In some examples, the instructions may cause the client device to determine the second string identifier based on contextual information generated by the first widget. Computing system 100 may configure client device 260 to obtain the configuration information and localization information associated with the software application (1404).

Computing system 100 may generate instructions configured to cause client device 260 to generate a first string value for the first string based on the first string identifier and the localization information and generate a second string value for the second string based on the second string identifier and the localization information (1406). Computing system 100 may generate the instructions that are further configured to cause the client device to map the first identifier to the first string value and to map the second identifier to the second string value. Computing system 100 may generate instructions that are configured to cause the client device to generate the first string value and the second string value according to a locality associated with the client device. In some examples, computing system 100 may generate instructions that are further configured to cause the client device to map the first identifier to the first string value and to map the second identifier to the second string value and wherein to generate the first string value and the second string value, the instructions are configured to cause the client device to generate the first string value according to a locality associated with the client device. In some examples, the locality may specify a human language. For example, the client device may be configured to generate the first string value and the second string value according to a locality such as a human language (e.g., English, Spanish, French, etc.). The locality may be selected by a user operating the client device or detected by the operating system of the client device. In some examples, the instructions may cause the client device to obtain a locality specified in an operating system (e.g., OS 674 of FIG. 6) of the client device. In some examples, the instructions may cause the client device to generate the first string value and the second string value based on localization information associated with the obtained locality. In some examples, the locality may be a first locality and the instructions may cause the client device to obtain an indication of a second locality selected by a user associated with the client device. In some examples, the instructions may cause the client device to determine the first widget supports the second locality. In some examples, the instructions may cause the client device to generate the first string value based on a first set of localization information associated with the second locality. In some examples, the instructions may cause the client device to determine the second widget does not support the second locality. In some examples, the instructions may cause the client device to generate the second string value based on a second set of localization information associated with the first locality.

In some examples, the instructions may cause the client device to download the localization information in response to a determination that the localization information is assigned to a locality associated with the client device. In some examples, the instructions may cause the client device to generate the first string value based on the first identifier and the localization information assigned to the locality. In some examples, the instructions may cause the client device to generate the second string value based on the second identifier and the localization information assigned to the locality. Computing system 100 may output the instruction to client device 260 to render a graphical user interface based, at least in part, on the first string values and the second string value (1408).

In some examples, the first identifier may be for a first instance of the first widget. In some examples, the instructions may cause the client device to determine a third string identifier for a second instance of the first widget. In some examples, the instructions may cause the client device to generate a third string value for the second instance of the first widget. In some examples, the instructions may cause the client device to render the graphical user interface further based, at least in part, on the third string value.

In some examples, the instructions may cause the client device to determine localization information is missing a mapping for a third string of the first widget configured to indicate a third identifier. In some examples, the instructions may cause the client device to generate the third string value based on the third identifier and a fallback string value. In some examples, the instructions may cause the client device to render the graphical user interface based, at least in part, on the third string value. In some examples, computing system 100 may include a localization telemetry module (e.g., localization telemetry module 226 of FIG. 2). In some examples, the instructions may cause the client device to send an indication that the localization information is missing the mapping for the third string to the localization telemetry module.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system for deploying a software application, the system comprising:

processing circuitry; and non-transitory computer-readable storage media comprising logic that, when executed, causes the processing circuitry to:

obtain configuration information for the software application, the configuration information specifying a first widget configured to indicate a first identifier for a first string and a second widget configured to indicate a second identifier for a second string;

configure a client device to obtain, based on a request from the client device to execute the software application, the configuration information and localization information associated with the software application, the localization information defining:

a first mapping of the first identifier to a first plurality of string values for the first string, wherein each string value of the first plurality of string values corresponds to one or more localities of a plurality of localities, and a second mapping of the second identifier to a second plurality of string values for the second string, wherein each string value of the second plurality of string values corresponds to at least one locality of the plurality of localities;

generate instructions configured to cause the client device to, based on the client device obtaining the configuration information and the localization information:

select a first string value from the first plurality of string values for the first string based on the first identifier being mapped to the first string value in the first mapping defined in the localization information, and select a second string value from the second plurality of string values for the second string based on the second identifier being mapped to the second string value in the second mapping defined in the localization information; and output the instructions to the client device to render a graphical user interface based, at least in part, on the first string value and the second string value.

2. The system of claim 1, wherein the instructions are further configured to cause the client device to map the first identifier to the first string value and to map the second identifier to the second string value.

3. The system of claim 1, wherein to generate the first string value and the second string value, the instructions are configured to cause the client device to select the first string value and the second string value according to a locality associated with the client device.

4. The system of claim 3, wherein the locality specifies a human language.

5. The system of claim 1, wherein the instructions are further configured to cause the client device to:

obtain a locality specified in an operating system of the client device; and select the first string value and the second string value based on localization information associated with the locality.

6. The system of claim 5, wherein the locality is a first locality, and wherein the instructions are further configured to cause the client device to:

obtain an indication of a second locality selected by a user associated with the client device;

determine the first widget supports the second locality;

select the first string value based on a first set of localization information associated with the second locality;

determine the second widget does not support the second locality; and select the second string value based on a second set of localization information associated with the first locality.

7. The system of claim 1, wherein the instructions are further configured to cause the client device to:

download the localization information in response to a determination that the localization information is assigned to a locality associated with the client device;

select the first string value based on the first identifier and the localization information assigned to the locality; and select the second string value based on the second identifier and the localization information assigned to the locality.

8. The system of claim 1, wherein the first identifier is for a first instance of the first widget, and wherein the instructions are further configured to cause the client device to:

determine a third string identifier for a second instance of the first widget; and select, based on the localization information, a third string value for the second instance of the first widget, wherein the instructions further cause the client device to render the graphical user interface further based, at least in part, on the third string value.

9. The system of claim 1, wherein the instructions are further configured to cause the client device to:

determine localization information is missing a third mapping for a third string identifier of the first widget;

select a third string value for the third string identifier as a fallback string value; and render the graphical user interface based, at least in part, on the third string value.

10. The system of claim 9, further comprising a localization telemetry module; and wherein the instructions are further configured to cause the client device to send an indication that the third mapping is missing to the localization telemetry module.

11. The system of claim 1, wherein the instructions are further configured to cause the client device to determine the second identifier for the second string based on contextual information generated by the first widget.

12. A method for deploying a software application, the method comprising:

obtaining, by processing circuitry, configuration information for the software application, the configuration information specifying a first widget configured to indicate a first identifier for a first string and a second widget configured to indicate a second identifier for a second string;

configuring, by the processing circuitry and based on a request from a client device to execute the software application, the client device to obtain the configuration information and localization information associated with the software application, the localization information defining:

a first mapping of: the first identifier to a first plurality of string values for the first string, wherein each string value of the first plurality of string values corresponds to one or more localities of a plurality of localities, and a second mapping of: the second identifier to a second plurality of string values for the second string, wherein each string value of the second plurality of string values corresponds to at least one locality of the plurality of localities;

generating, by the processing circuitry, instructions configured to cause the client device to, based on the client device obtaining the configuration information and the localization information:

select a first string value from the first plurality of string values for the first string based on the first identifier being mapped to the first string value in the first mapping defined in the localization information, and select a second string value from the second plurality of string values for the second string based on the second identifier being mapped to the second string value in the second mapping defined in the localization information;

and outputting, by the processing circuitry, the instructions to the client device to render a graphical user interface based, at least in part, on the first string value and the second string value.

13. The method of claim 12, wherein the instructions are further configured to cause the client device to map the first identifier to the first string value and to map the second identifier to the second string value.

14. The method of claim 12, wherein to select the first string value and the second string value, the instructions are configured to cause the client device to select the first string value and the second string value according to a locality associated with the client device.

15. The method of claim 12, wherein the instructions are further configured to cause the client device to:

obtain a locality specified in an operating system of the client device; and select the first string value and the second string value based on localization information associated with the locality.

16. The method of claim 15, wherein the locality is a first locality, and wherein the instructions are further configured to cause the client device to:

obtain an indication of a second locality selected by a user associated with the client device;

determine the first widget supports the second locality;

select the first string value based on a first set of localization information associated with the second locality;

determine the second widget does not support the second locality; and select the second string value based on a second set of localization information associated with the first locality.

17. The method of claim 12, wherein the instructions are further configured to cause the client device to:

download the localization information in response to a determination that the localization information is assigned to a locality associated with the client device;

select the first string value based on the first identifier and the localization information assigned to the locality; and select the second string value based on the second identifier and the localization information assigned to the locality.

18. The method of claim 12, wherein the first identifier is for a first instance of the first widget, and wherein the instructions are further configured to cause the client device to:

determine a third string identifier for a second instance of the first widget; and select, based on the localization information, a third string value for the second instance of the first widget, wherein the instructions further cause the client device to render the graphical user interface further based, at least in part, on the third string value.

19. The method of claim 12, wherein the instructions are further configured to cause the client device to:

determine localization information is missing a mapping for a third string identifier of the first widget;

select a third string value for the third string identifier as a fallback string value; and render the graphical user interface based, at least in part, on the third string value.

20. Non-transitory computer-readable storage media comprising logic that, when executed, causes processing circuitry to:

obtain configuration information for a software application, the configuration information specifying a first widget configured to indicate a first identifier for a first string and a second widget configured to indicate a second identifier for a second string;

configure a client device to obtain, based on a request from the client device to execute the software application, the configuration information and localization information associated with the software application, the localization information defining:

a first mapping of: the first identifier to a first plurality of string values for the first string, wherein each string value of the first plurality of string values corresponds to one or more localities of a plurality of localities, and a second mapping of: the second identifier to a second plurality of string values for the second string, wherein each string value of the second plurality of string values corresponds to at least one locality of the plurality of localities;

generate instructions configured to cause the client device to, based on the client device obtaining the configuration information and the localization information:

select a first string value from the first plurality of string values for the first string based on the first identifier being mapped to the first string value in the first mapping defined in the localization information, and select a second string value from the second plurality of string values for the second string based on the second identifier being mapped to the second string value in the second mapping defined in the localization information;

and output the instructions to the client device to render a graphical user interface based, at least in part, on the first string value and the second string value.

* * * * *